US012756869B2

(12) United States Patent
Zhang et al.

(10) Patent No.: US 12,756,869 B2
(45) **Date of Patent: *Oct. 6, 2026**

(54) IMAGE ENCODING, DECODING METHOD AND DEVICE, CODER-DECODER

(71) Applicant: BOE TECHNOLOGY GROUP CO., LTD., Beijing (CN)

(72) Inventors: Lijie Zhang, Beijing (CN); Guannan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 78 days.

This patent is subject to a terminal disclaimer.

(21) Appl. No.: 18/818,831

(22) Filed: Aug. 29, 2024

(65) Prior Publication Data

US 2025/0063204 A1 Feb. 20, 2025

Related U.S. Application Data

(63) Continuation of application No. 17/615,156, filed as application No. PCT/CN2021/072935 on Jan. 20, 2021, now Pat. No. 12,177,489.

(51) Int. Cl.
*H04N 19/00* (2014.01)
*H04N 19/105* (2014.01)
(Continued)

(52) U.S. Cl.
CPC .......... *H04N 19/80* (2014.11); *H04N 19/105* (2014.11); *H04N 19/117* (2014.11);
(Continued)

(58) Field of Classification Search
None
See application file for complete search history.

(56) References Cited

U.S. PATENT DOCUMENTS

| | | | | |
|---|---|---|---|---|
| 10,586,312 B2 | 3/2020 | Rijnders | | |
| 2011/0235910 A1* | 9/2011 | Soceanu | ............ | G06V 40/173<br>382/173 |

(Continued)

FOREIGN PATENT DOCUMENTS

| | | |
|---|---|---|
| CN | 1674678 A | 9/2005 |
| CN | 102088597 A | 6/2011 |

(Continued)

OTHER PUBLICATIONS

Himawan et al. "Adaptive Bilateral Filtering Using Saliency Map for Deblocking Low Bit Rate Videos". (Year: 2014).*

(Continued)

*Primary Examiner* — Zhihan Zhou
(74) *Attorney, Agent, or Firm* — XSENSUS LLP

(57) ABSTRACT

The present disclosure relates to the field of image processing technology, and in particular, to image encoding, decoding methods and devices, an encoder-decoder. The method includes: acquiring a visual saliency heat map of an image of a current frame, and filtering, by using the visual saliency heat map of the image of the current frame, the image of the current frame to obtain a target image; acquiring, by using the target image and an input image of a next frame, a motion estimation vector and a target prediction image of the input image of the next frame; and encoding a difference image between the input image of the next frame and the target prediction image and the motion estimation vector.

14 Claims, 11 Drawing Sheets

(51) Int. Cl.

| | |
|---|---|
| ***H04N 19/117*** | (2014.01) |
| ***H04N 19/139*** | (2014.01) |
| ***H04N 19/172*** | (2014.01) |
| ***H04N 19/436*** | (2014.01) |
| ***H04N 19/52*** | (2014.01) |
| ***H04N 19/80*** | (2014.01) |

(52) U.S. Cl.

CPC ......... *H04N 19/139* (2014.11); *H04N 19/172* (2014.11); *H04N 19/436* (2014.11); *H04N 19/52* (2014.11)

(56) References Cited

U.S. PATENT DOCUMENTS

| | | | | |
|---|---|---|---|---|
| 2012/0027092 | A1 | 2/2012 | Matsui | |
| 2016/0210528 | A1 | 7/2016 | Duan | |
| 2017/0270653 | A1* | 9/2017 | Garnavi | G06T 7/0002 |
| 2017/0323452 | A1* | 11/2017 | Chen | G06F 17/18 |
| 2018/0115745 | A1* | 4/2018 | Kimura | G09G 5/00 |
| 2018/0240221 | A1* | 8/2018 | Rijnders | H04N 19/149 |
| 2018/0307935 | A1* | 10/2018 | Rao | G06V 10/764 |
| 2019/0122059 | A1* | 4/2019 | Zhou | G06V 10/82 |
| 2022/0153278 | A1* | 5/2022 | Rosman | B60W 40/08 |
| 2022/0404169 | A1* | 12/2022 | Ito | G06V 30/1437 |

FOREIGN PATENT DOCUMENTS

| | | | |
|---|---|---|---|
| CN | 102509099 | A | 6/2012 |
| CN | 102693426 | A | 9/2012 |
| CN | 103714537 | A | 4/2014 |
| CN | 104268886 | A | 1/2015 |
| CN | 105516721 | A | 4/2016 |
| CN | 107220952 | A | 9/2017 |
| CN | 107239203 | A | 10/2017 |
| CN | 110300977 | A | 10/2019 |
| CN | 107220952 | B | 3/2020 |
| CN | 111787330 | A | 10/2020 |
| CN | 111797841 | A | 10/2020 |
| EP | 3364342 | A1 | 8/2018 |
| EP | 3583547 | A1 | 12/2019 |
| JP | 2020-074624 | A | 5/2020 |
| WO | 2018150024 | A1 | 8/2018 |

OTHER PUBLICATIONS

Office Action issued on Dec. 27, 2024, in corresponding Chinese patent Application No. 202180000035.3, 101 pages.

The Second Office Action mailed Jun. 10, 2025, in Chinese Application No. 202180000035.3, 28 pages including English translation.

Chen, Yue, "Image Coding Region of Visual Saliency", China Excellent Doctoral and Master's Thesis Full-text Database (Master) Information Series, Nov. 2013, 66 pages.

Yan, Xiong "Saliency Computing Based on Depth and Texture Information," China Excellent Doctoral and Master's Thesis Full-text Database (Master) Information Series, Dec. 2013, 60 pages.

Written Opinion for PCT Patent Application No. PCT/CN2021/072935 mailed Aug. 31, 2021.

* cited by examiner

IMAGE ENCODING, DECODING METHOD AND DEVICE, CODER-DECODER

CROSS-REFERENCE TO RELATED APPLICATIONS

The present application is a continuation application of U.S. application Ser. No. 17/615,156, filed on Nov. 30, 2021, which is based upon International Application No. PCT/CN2021/072935, filed on Jan. 20, 2021, the entire contents of each are incorporated herein by reference.

TECHNICAL FIELD

The present disclosure relates to the field of image processing technology, and in particular, to an image encoding method, encoding device, decoding amplification, decoding device, coder-decoder, computer-readable storage medium, and electronic device.

BACKGROUND

In a video compressing and coding framework, a loop filter module and a motion compensation module are key modules of improving compression efficiency and video reconstruction quality.

At present, the traditional loop filter and motion compensation scheme are designed based on macroblocks, in which calculation, it is necessary to perform complex calculation on the relationship between each macroblock and other macroblocks and greatly consider local image information, so that the quality improvement of video compression and reconstruction is limited.

It should be noted that the information of the present disclosure in the above background section is only used for enhancing the understanding of the background of the present disclosure, and therefore may include information that does not constitute the prior art known to those skilled in the art.

SUMMARY

A first aspect of the present disclosure provides an image encoding method, including:

- acquiring a visual saliency heat map of an image of a current frame, and filtering, by using the visual saliency heat map of the image of the current frame, a to-be-processed image to obtain a target image;
- acquiring, by using the target image and an input image of a next frame, a motion estimation vector and a target prediction image of the input image of the next frame; and
- encoding a difference image between the input image of the next frame and the target prediction image and the motion estimation vector.

A second aspect of the present disclosure provides an image decoding method, including:

- acquiring a reference prediction image of a current frame;
- obtaining a decoded difference image by decoding encoded data of a difference image between an input image of the current frame and the reference prediction image;
- obtaining a to-be-processed image according to the decoded difference image and the reference prediction image; and
- acquiring a visual saliency heat map of the to-be-processed image of the current frame, and filtering, by using the visual saliency heat map of the to-be-processed image of the current frame, the to-be-processed image to obtain an output image of the current frame.

A third aspect of the present disclosure provides an encoding device, including:

- a filtering module, configured to acquire a visual saliency heat map of an image of a current frame, and filter, by using the visual saliency heat map of the image of the current frame, a to-be-processed image to obtain a target image;
- a prediction module, configured to acquire, by using the target image and an input image of a next frame, a motion estimation vector and a target prediction image of the input image of the next frame; and
- an encoding module, configured to encode a difference image between the input image of the next frame and the target prediction image and the motion estimation vector.

A fourth aspect of the present disclosure provides a decoding device, including:

- an acquiring module, configured to acquire a reference prediction image of a current frame;
- a decoding module, configured to obtain a decoded difference image by decoding encoded data of a difference image between an input image of the current frame and the reference prediction image;
- a generating module, configured to obtain a to-be-processed image according to the decoded difference image and the reference prediction image; and
- a filtering module, configured to acquire a visual saliency heat map of the to-be-processed image of the current frame, and filter, by using the visual saliency heat map of the to-be-processed image of the current frame, the to-be-processed image to obtain an output image of the current frame.

A fifth aspect of the present disclosure provides a coder-decoder, including:

- a decoding module, configured to obtain a decoded difference image by decoding encoded data of a difference image between an input image of a current frame and a reference prediction image of the current frame;
- a generating module, configured to obtain a to-be-processed image according to the decoded difference image and the reference prediction image;
- a filtering module, configured to acquire a visual saliency heat map of the to-be-processed image of the current frame, and filter, by using the visual saliency heat map of the to-be-processed image of the current frame, the to-be-processed image to obtain a target image;
- a prediction module, configured to acquire, by using the target image and an input image of a next frame, a motion estimation vector and a target prediction image of the input image of the next frame; and
- an encoding module, configured to encode a difference image between the input image of the next frame and the target prediction image and the motion estimation vector.

A sixth aspect of the present disclosure provides a computer-readable storage medium having a computer program stored thereon, wherein when the computer program is executed by a processor, the above method is implemented.

A seventh aspect of the present disclosure provides an electronic device, including any one of the above image encoding devices or any one of the image decoding devices, or any one of the above coder-decoders.

BRIEF DESCRIPTION OF THE DRAWINGS

The drawings herein are incorporated into the specification and constitute a part of the specification, show embodiments that conform to the present disclosure, and together with the specification, serve to explain the principle of the present disclosure. Obviously, the drawings in the following description are only some embodiments of the present disclosure, and other drawings can be obtained by those skilled in the art from these drawings without creative work. In the drawings.

DETAILED DESCRIPTION

Figure 1:
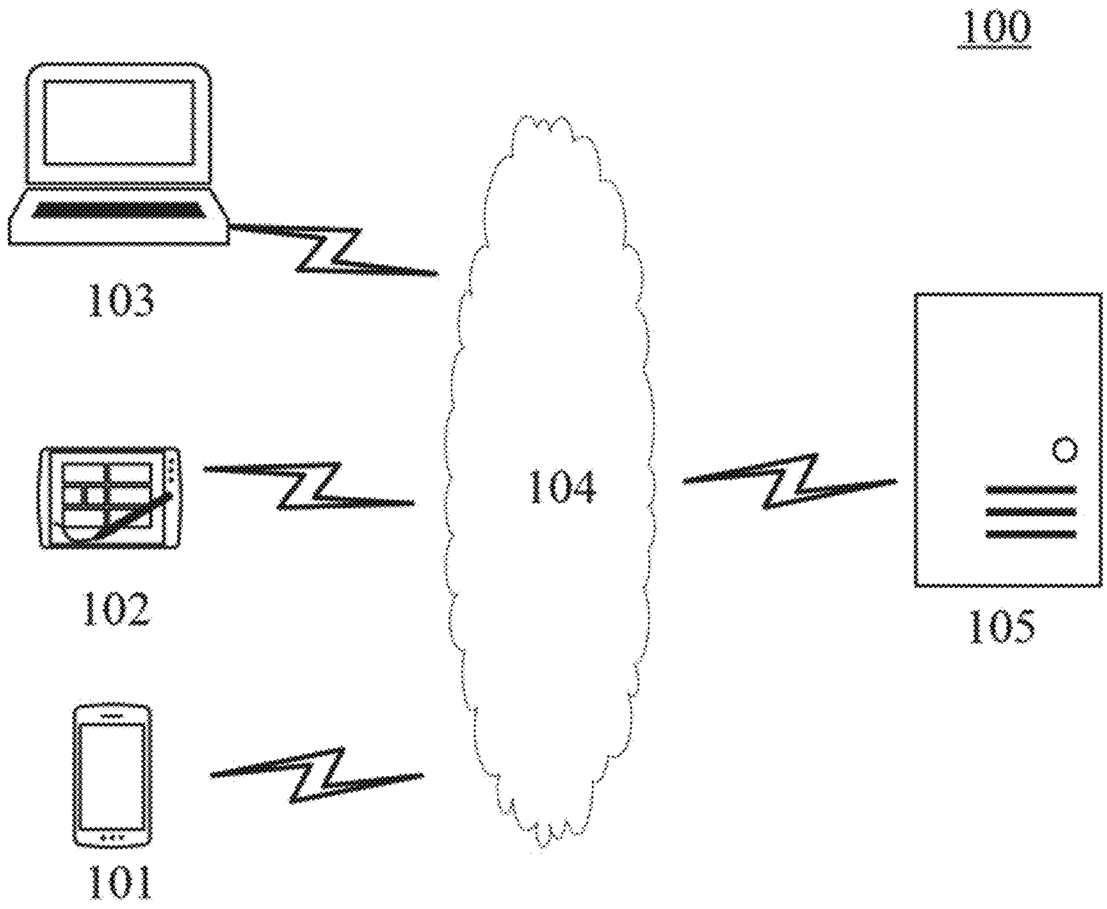
FIG. 1 shows a schematic diagram of an exemplary system architecture to which an embodiment of the present disclosure may be applied.

Example embodiments will now be described more fully with reference to the accompanying drawings. However, the example embodiments may be implemented in various forms, and should not be construed as being limited to the examples set forth herein; on the contrary, these embodiments are provided so that the present disclosure is more comprehensive and complete, and the concept of the example embodiments is fully conveyed to those skilled in the art. The described features, structures or characteristics may be combined in one or more embodiments in any suitable way.

In addition, the drawings are only schematic illustrations of the present disclosure, and are not necessarily drawn to scale. The same reference numerals in the figures denote the same or similar parts, and thus their repeated description will be omitted. Some of the block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

FIG. 1 shows a schematic diagram of a system architecture of an exemplary application environment to which an encoding method, encoding device, decoding amplification, and decoding device according to an embodiment of the present disclosure may be applied.

As shown in FIG. 1, the system architecture 100 may include one or more of terminal devices 101, 102, and 103, a network 104 and a server 105. The network 104 is used to provide a medium for communication link between the terminal devices 101, 102, 103 and the server 105. The network 104 may include various connection types, such as wired, wireless communication links, or fiber optic cables. The terminal devices 101, 102, 103 may be electronic devices with various encoding and/or decoding functions, including but not being limited to desktop computers, portable computers, smart phones, tablet computers. It should be understood that the numbers of terminal devices, networks, and servers in FIG. 1 are merely illustrative. According to implementation needs, there may be any number of terminal devices, networks, and servers. For example, the server 105 may be a server cluster including a plurality of servers.

The encoding method and/or decoding method provided by an embodiment of the present disclosure are generally executed in the terminal devices 101, 102, 103, and correspondingly, the encoding device and/or decoding device are generally disposed in the terminal device 101, 102, 103. However, those skilled in the art can easily understand that the encoding method and/or decoding method provided by an embodiment of the present disclosure may also be executed by the server 105. Correspondingly, the encoding device and/or decoding device may also be disposed in the server 105. This is not particularly limited in the exemplary embodiment. For example, in an exemplary embodiment, the user may use the terminal devices 101, 102, 103 to encode an image and upload encoded data to the server 105, the server decodes the encoded data using the decoding method provided by an embodiment of the present disclosure; or the server encodes the image using the encoding method provided by an embodiment of the present disclosure and transmits it to the terminal devices 101, 102, 103, and the terminal devices 101, 102, 103 decodes the encoded data using the decoding method provided by an embodiment of the present disclosure.

An exemplary embodiment of the present disclosure provides an electronic device for implementing an encoding method or a decoding method, which may be the terminal devices 101, 102, 103 or the server 105 in FIG. 1. The electronic device at least includes a processor and a memory, and the memory is used to store executable instructions of the processor.

The configuration of the electronic device will be described below by taking the mobile terminal 200 in FIG. 2 as an example. Those skilled in the art should understand that, in addition to parts specifically used for mobile purposes, the configuration in FIG. 2 may also be applied to a fixed-type device. In some other embodiments, the mobile terminal 200 may include more or fewer components than that shown in the figure, or combine certain components, or split certain components, or arrange different components. The illustrated components may be implemented in hardware, software, or a combination of software and hardware. The interface connection relationship between the components is only shown schematically, and does not constitute a structural limitation of the mobile terminal 200. In some other embodiments, the mobile terminal 200 may also adopt a different interface connection manner from that shown in FIG. 2 or a combination of a plurality of interface connection manners.

Figure 2:
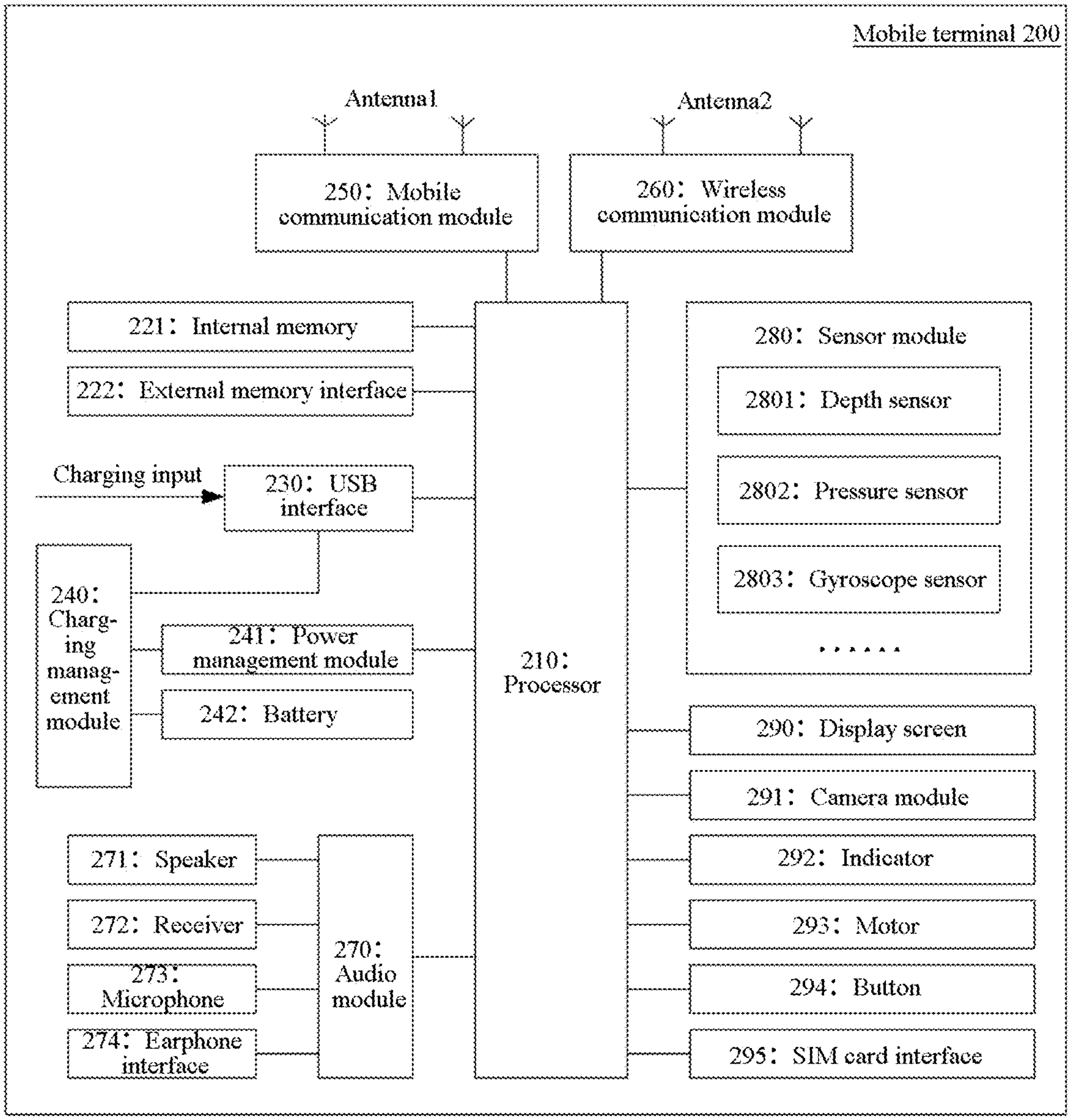
FIG. 2 shows a schematic diagram of an electronic device to which an embodiment of the present disclosure may be applied.

As shown in FIG. 2, the mobile terminal 200 may specifically include: a processor 210, an internal memory 221, an external memory interface 222, a universal serial bus (USB) interface 230, a charging management module 240, a power management module 241, a battery 242, an antenna 1, an antenna 2, a mobile communication module 250, a wireless communication module 260, an audio module 270, a speaker 271, a receiver 272, a microphone 273, an earphone interface 274, a sensor module 280, a display screen 290, a camera module 291, an indicator 292, a motor 293, a button 294, a subscriber identification module (SIM) card interface 295, and the like. The sensor module 280 may include a depth sensor 2801, a pressure sensor 2802, a gyroscope sensor 2803, and the like.

The processor 210 may include one or more processing units. For example, the processor 210 may include an application processor (AP), a modem processor, a graphics processing unit (GPU), an image signal processor (ISP), a controller, a video codec, a digital signal processor (DSP), a baseband processor, and/or a neural-network processing unit (NPU) and the like. The different processing units may be independent devices or integrated in one or more processors.

The NPU is a neural network (NN) computing processor, which can quickly process input information by referring to the structure of biological neural network (for example, the transfer mode between human brain neurons), and can also continuously self-learn. Through the NPU, an application such as intelligent cognition (for example, image recognition, face recognition, voice recognition, text understanding) of the mobile terminal 200 may be realized.

The processor 210 is provided with a memory. The memory may store instructions for implementing six modular functions: detection instructions, connection instructions, information management instructions, analysis instructions, data transmission instructions, and notification instructions, which is controlled by the processor 210 to be executed.

The charging management module 240 is used to receive charging input from a charger. The power management module 241 is used to connect the battery 242, the charging management module 240, and the processor 210. The power management module 241 receives input from the battery 242 and/or the charging management module 240, and supplies power to the processor 210, the internal memory 221, the display screen 290, the camera module 291, and the wireless communication module 260.

The wireless communication function of the mobile terminal 200 may be implemented by the antenna 1, the antenna 2, the mobile communication module 250, the wireless communication module 260, the modem processor, and the baseband processor. The antenna 1 and the antenna 2 are used to transmit and receive electromagnetic wave signals; the mobile communication module 250 may provide wireless communication solutions including 2G/3G/4G/5G that are applied to the mobile terminal 200; the modem processor may include modulator and demodulator; and the wireless communication module 260 may provide wireless communication solutions including wireless local area network (WLAN) (such as wireless fidelity (Wi-Fi) network), Bluetooth (BT) which are applied to the mobile terminal 200. In some embodiments, the antenna 1 of the mobile terminal 200 is coupled with the mobile communication module 250, and the antenna 2 is coupled with the wireless communication module 260, so that the mobile terminal 200 may communicate with the network and other devices through wireless communication technology.

The mobile terminal 200 implements a display function through the GPU, the display screen 290, the application processor, and the like. The GPU is a microprocessor for image processing, and is connected to the display screen 290 and the application processor. The GPU is used to perform mathematical and geometric calculations for graphics rendering. The processor 210 may include one or more GPUs that execute program instructions to generate or change display information.

The mobile terminal 200 may implement a photographing function through the ISP, the camera module 291, the video codec, the GPU, the display screen 290, and the application processor. The ISP is used to process the data fed back by the camera module 291; the camera module 291 is used to capture static images or videos; the digital signal processor is used to process digital signals, and may further process other digital signals; the video codec is used to compress or decompress digital video, and the mobile terminal 200 may also support one or more video codecs.

The external memory interface 222 may be used to connect an external memory card, such as a Micro SD card, to expand the storage capacity of the mobile terminal 200. The external memory card communicates with the processor 210 through the external memory interface 222 to realize a data storage function, for example, to save files such as music, video in the external memory card.

The internal memory 221 may be used to store computer executable program code, and the executable program code includes instructions. The internal memory 221 may include a program storage area and a data storage area. The program storage area may store an operating system and an application program for at least one function (such as a sound playback function, an image playback function). The data storage area may store data (such as audio data, phone book) created during the use of the mobile terminal 200. In addition, the internal memory 221 may include a high-speed random access memory, and may also include a non-volatile memory, such as at least one magnetic disk storage device, a flash memory device, a universal flash storage (UFS). The processor 210 executes various functional applications and data processing of the mobile terminal 200 by running instructions stored in the internal memory 221 and/or instructions stored in the memory provided in the processor.

The mobile terminal 200 may implement audio functions (such as music playback, recording) through the audio module 270, the speaker 271, the receiver 272, the microphone 273, the headset interface 274, the application processor, and the like.

The depth sensor 2801 is used to obtain depth information of photographic field. In some embodiments, the depth sensor may be provided in the camera module 291.

The pressure sensor 2802 is used to sense the pressure signal and may convert the pressure signal into an electrical signal. In some embodiments, the pressure sensor 2802 may be provided on the display screen 290. There are many types of pressure sensors 2802, such as resistive pressure sensors, inductive pressure sensors, capacitive pressure sensors.

The gyroscope sensor 2803 may be used to determine the movement posture of the mobile terminal 200. In some embodiments, angular velocities of the mobile terminal 200 around three axes (i.e., x, y, and z axes) may be determined by the gyroscope sensor 2803. The gyroscope sensor 2803 may be used for shooting anti-shake, navigation, somatosensory game scene and the like.

In addition, sensors with other functions may be disposed in the sensor module 280 according to actual needs, such as air pressure sensor, magnetic sensor, acceleration sensor, distance sensor, proximity light sensor, fingerprint sensor, temperature sensor, touch sensor, ambient light sensor, bone conduction sensor.

The mobile terminal 200 may also include other devices that provide auxiliary functions, for example, the button 294 includes a power-on button, a volume button and the like, and the user may input through the button to generate a key signal input related to the user settings and function control of the mobile terminal 200, for another example, the indicator 292, the motor 293, the SIM card interface 295 and the like.

An encoding method, a decoding method, an encoding device and a decoding device according to an exemplary embodiment of the present disclosure will be described in detail below.

Figure 3:
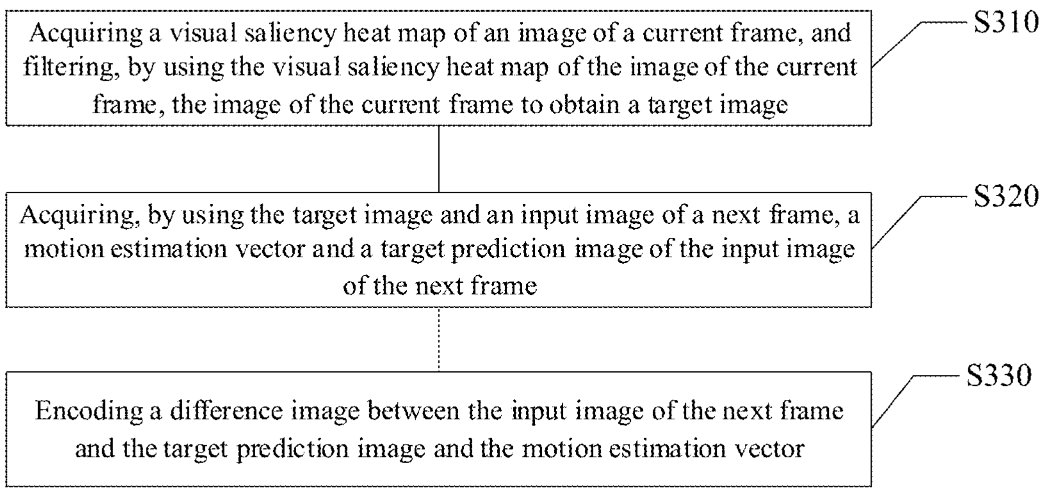
FIG. 3 schematically shows a flowchart of an image encoding method according to an exemplary embodiment of the present disclosure.

FIG. 3 shows a flowchart of an encoding method according to an exemplary embodiment, including:

step S310, acquiring a visual saliency heat map of an image of a current frame, and filtering, by using the visual saliency heat map of the image of the current frame, the image of the current frame to obtain a target image;

step S320, acquiring, by using the target image and an input image of a next frame, a motion estimation vector and a target prediction image of the input image of the next frame; and step S330, encoding a difference image between the input image of the next frame and the target prediction image and the motion estimation vector.

In an exemplary embodiment, filtering the image by using the visual saliency heat map of the image of the current frame may improve the display effect of the obtained target image, thereby improving the accuracy of the acquired target prediction image, and improving the encoding accuracy. Further, different filtering mechanisms are used in different saliency areas during the filtering process, which avoids blurring of details, loss of encoding information, and low image clarity during video decoding due to excessive filtering of a foreground target, and which may also avoid generating too much noise in a smooth background area of the image due to insufficient filtering strength, and thus increasing redundant encoding information, reducing encoding efficiency, and causing large video noise and quality degradation during video decoding.

In step S310, the visual saliency heat map of the image of the current frame is acquired, and a to-be-processed image is filtered by using the visual saliency heat map of the image of the current frame to obtain the target image.

In an exemplary embodiment of the present disclosure, acquiring the visual saliency heat map of the image of the current frame may include acquiring a visual saliency heat map of an input image of the current frame, or acquiring a visual saliency heat map of a to-be-processed image of the current frame. The visual saliency heat map may have different colors, and the different colors may represent different saliency scores, that is, the input image of the current frame or the to-be-processed image of the current frame may be divided into different areas with different colors, and then the saliency score of each area may be determined. The saliency score may be related to a human eye attention, that is, when the human eye attention is high, and the saliency score is high in the area that is mainly the foreground target with more details, and when the human eye attention is low, the saliency score is low in the area that is mainly the smooth background is low.

Figure 4:
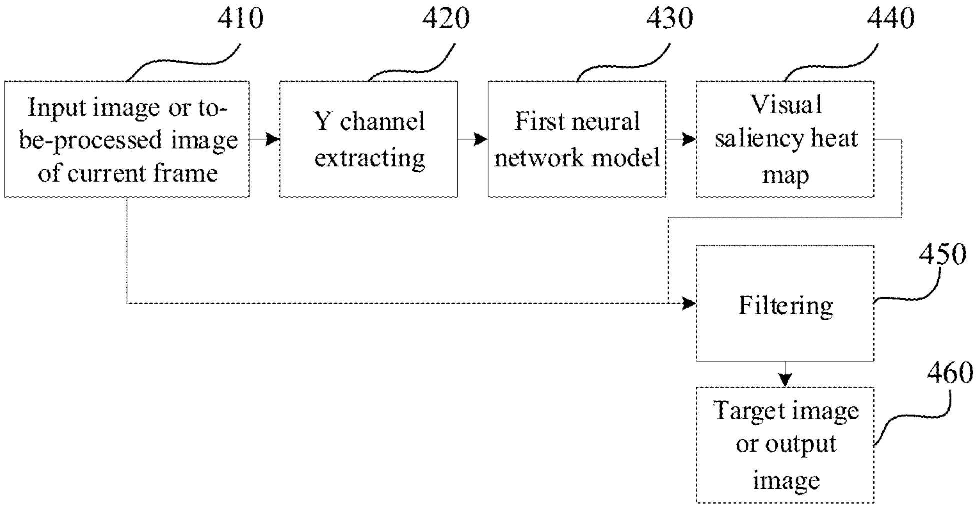
FIG. 4 schematically shows a data flow diagram for filtering an image of a current frame according to an exemplary embodiment of the present disclosure.

In an exemplary embodiment, referring to FIG. 4, when acquiring the visual saliency heat map of the input image of the current frame, a trained first neural network model 430 of an attention mechanism may be acquired first. The first neural network model 430 may be a CNN network model based on a Unet and the attention mechanism. The input of the first neural network model 430 is a brightness image of the input image 410 of the current frame, and the image of a brightness channel is directly used as the input of the first neural network model 430. The output of the first neural network model 430 is the visual saliency heat map 440 of the input image 410 of the current frame. The brightness image of the input image of the current frame may be extracted 420 through the Y channel first, and then the brightness image of the input image of the current frame is input to the above-mentioned first neural network model to obtain the visual saliency heat map of the input image of the current frame. Then, the input image of the current frame may be filtered 450 by using the visual saliency heat map of the input image of the current frame to obtain the target image 460.

In an exemplary embodiment, the saliency score of each area in the visual saliency heat map may be used to determine the filtering mechanism of each area in the input image of the current frame. A low-intensity filtering mechanism may be used for the area with a higher saliency score to remain details as much as possible, and a high-intensity filtering mechanism may be used for the area with a low saliency score to remove block effects as much as possible, to avoid blurring of details, loss of encoding information, and low image clarity during video decoding due to excessive filtering of a foreground target, and to further avoid generating too much noise in a smooth background area of the image due to insufficient filtering strength, and thus increasing redundant encoding information, reducing encoding efficiency, and causing large video noise and quality degradation during video decoding.

In an exemplary embodiment, the above saliency heat map may be divided into areas according to the colors in the saliency heat map. For example, the colors of the visual saliency heat map may include red, yellow, green, and blue, and the color may be set when the above first neural network model is trained. The above colors may also include other colors, which are not specifically limited in the embodiment of the present disclosure.

The areas corresponding to the above different colors may be provided with different saliency scores, for example, a red area may be provided with the saliency score of 100, a yellow area may be provided with the saliency score of 75, an area between the yellow and the red may be provided with the saliency score greater than 75 and less than 100, a green area may be provided with the saliency score of 50, a light blue area may be provided with the saliency score of 25, and a dark blue area may be provided with the saliency score of 0.

In an exemplary embodiment of the present disclosure, the above two colors may also be set to the same area, for example, the red and yellow are set to the same area, and green and blue are set to the same area, which is not specifically limited in the exemplary embodiment of the present disclosure.

When the filtering is performed, a unit filtering area may be first determined. The size of the unit filtering area may be set by a user, and is not specifically limited in the exemplary embodiment. A proportion of each color in the unit filtering area is determined. The saliency score corresponding to the color with the largest proportion is determined as the saliency score of the unit filtering area, and then the filtering mechanism of each unit filtering area is determined according to the saliency score.

Specifically, a first-level intensity filtering mechanism may be used for the unit filtering area with the saliency score of 75-100, a second-level intensity filtering mechanism may be used for the unit filtering area with the saliency score of 50-75, a third-level intensity filtering mechanism may be used for the unit filtering area with the saliency score of 25-50, and a fourth-level intensity filtering mechanism may be used for the unit filtering area with the saliency score of 0-25. The filtering intensity of the first-level intensity filtering mechanism is smaller than the filtering intensity of the second-level intensity filtering mechanism, the filtering intensity of the second-level intensity filtering mechanism is smaller than the filtering intensity of the third-level intensity filtering mechanism, and the filtering strength of the third-level intensity filtering mechanism is smaller than the filtering intensity of the fourth-level strength filtering mechanism. The filter used for filtering may be a filter of the encoding standard framework in the related technology, for example, the filter of the H246 framework. The filter includes parameters that may adjust the filtering strength. Different filtering mechanisms may be applied to areas with different saliency scores through adjusting the parameters. The filtering strength refers to a fineness of removing the blocking effect in the image. The higher the fineness of removing the blocking effect, the higher the accuracy of removing the blocking effect, and the higher the filtering strength.

Figure 5:
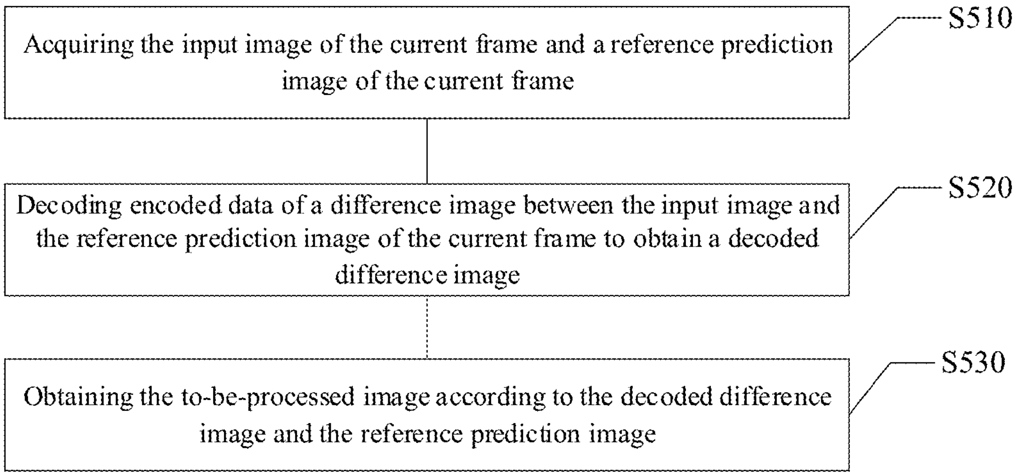
FIG. 5 schematically shows a flow chart of acquiring a to-be-processed image according to an exemplary embodiment of the present disclosure.

When acquiring the visual saliency heat map of the to-be-processed image of the current frame, referring to FIG. 5, steps S510 to S530 may be included.

In step S510, the input image of the current frame and a reference prediction image of the current frame are acquired.

In an exemplary embodiment, each reference prediction image of the input image of the current frame may be acquired first. The reference prediction image of the current frame may be obtained by performing motion estimation according to the to-be-processed image of a previous frame and the input image of the current frame, or may be obtained by performing the motion estimation according to the input image of the current frame and the input image of the previous frame, which is not specifically limited in the exemplary embodiment.

In step S520, encoded data of a difference image between the input image and the reference prediction image of the current frame is decoded to obtain a decoded difference image.

In an exemplary embodiment, after the above reference prediction image is acquired, the input image and the reference prediction image of the current frame may be used to obtain the difference image between the input image and the reference prediction image of the current frame, and the difference image will be encoded during encoding. Therefore, when the next frame is encoded, since the to-be-processed image of the image of the previous frame is required to be used as a reference image to acquire the target prediction image of the image of the next frame, the encoded data of the encoded difference image may be decoded to obtain the decoded difference image.

In an exemplary embodiment, the encoding process may include transformation and quantization. When encoding, a controller may provide encoding parameters. In the transformation, the difference image may be transformed according to the size unit of the transform block contained in the encoding parameters, for example, by using discrete cosine transformation (DCT), KL transformation in which a basic design is pre-made for a specific learning series, and other orthogonal transformation processing. The quantization may quantize the difference image according to quantization parameters in the above encoding parameters, and then the quantized transformation coefficient is output as the above encoding data. The quantization and transformation are commonly used technical means in related coding technologies, which are not repeated herein.

In an exemplary embodiment, decoding the encoded data of the difference image to obtain the difference image may include performing inverse quantization and inverse transformation on the above encoded data. Specifically, the inverse quantization is performed on the encoded data according to the quantization parameter in the encoding parameter, and the inverse transformation (for example, inverse DCT, inverse KL transformation) is performed on the encoded data to which the inverse quantization has been applied according to the size unit of the transformation block in the encoding parameter to obtain the decoded difference image.

In step S530, the to-be-processed image is obtained according to the decoded difference image and the reference prediction image.

In an exemplary embodiment, the above decoded difference image and the above reference prediction image may be added to obtain the above to-be-processed image.

In an exemplary embodiment, referring to FIG. 4, a trained first neural network model 430 of an attention mechanism may be acquired first. The input of the first neural network model 430 is a brightness image of the to-be-processed image 410 of the current frame, and the output of the first neural network model 430 is the visual saliency heat map 440 of the to-be-processed image of the current frame. The brightness image of the to-be-processed image of the current frame may be extracted 420 through the Y channel first, and then the brightness image is input to the above-mentioned first neural network model to obtain the visual saliency heat map of the to-be-processed image of the current frame. Then, the to-be-processed image of the current frame may be filtered 450 by using the visual saliency heat map of the current frame to obtain the target image 460.

In an exemplary embodiment, the saliency score of each area in the visual saliency heat map may be used to determine the filtering mechanism of each area in the to-be-processed image of the current frame. A low-intensity filtering mechanism may be used for the area with a higher saliency score to remain details as much as possible, and a high-intensity filtering mechanism may be used for the area with a low saliency score to remove block effects as much as possible, to avoid blurring of details, loss of encoding information, and low image clarity during video decoding due to excessive filtering of a foreground target, and to further avoid generating too much noise in a smooth background area of the image due to insufficient filtering strength, and thus increasing redundant encoding information, reducing encoding efficiency, and causing large video noise and quality degradation during video decoding.

In an exemplary embodiment, the above saliency heat map may be divided into areas according to the colors in the saliency heat map. For example, the colors of the visual saliency heat map may include red, yellow, green, and blue, and the color may be set when the above first neural network model is trained. The above colors may also include other colors, which are not specifically limited in the embodiment of the present disclosure.

The areas corresponding to the above different colors may be provided with different saliency scores, for example, a red area may be provided with the saliency score of 100, a yellow area may be provided with the saliency score of 75, an area between the yellow and the red may be provided with the saliency score greater than 75 and less than 100, a green area may be provided with the saliency score of 50, a light blue area may be provided with the saliency score of 25, and a dark blue area may be provided with the saliency score of 0.

In an exemplary embodiment of the present disclosure, the above two colors may also be set to the same area, for example, the red and yellow are set to the same area, and green and blue are set to the same area, which is not specifically limited in the exemplary embodiment of the present disclosure.

When the filtering is performed, a unit filtering area may be first determined. The size of the unit filtering area may be set by a user, and is not specifically limited in the exemplary embodiment. A proportion of each color in the unit filtering area is determined. The saliency score corresponding to the color with the largest proportion is determined as the saliency score of the unit filtering area, and then the filtering mechanism of each unit filtering area is determined according to the saliency score.

Specifically, a first-level intensity filtering mechanism may be used for the unit filtering area with the saliency score of 75-100, a second-level intensity filtering mechanism may be used for the unit filtering area with the saliency score of 50-75, a third-level intensity filtering mechanism may be used for the unit filtering area with the saliency score of 25-50, and a fourth-level intensity filtering mechanism may be used for the unit filtering area with the saliency score of 0-25. The filtering intensity of the first-level intensity filtering mechanism is smaller than the filtering intensity of the second-level intensity filtering mechanism, the filtering intensity of the second-level intensity filtering mechanism is smaller than the filtering intensity of the third-level intensity filtering mechanism, and the filtering strength of the third-level intensity filtering mechanism is smaller than the filtering intensity of the fourth-level strength filtering mechanism. The filter used for filtering may be a filter of the encoding standard framework in the related technology, for example, the filter of the H246 framework. The filter includes parameters that may adjust the filtering strength. Different filtering mechanisms may be applied to areas with different saliency scores through adjusting the parameters.

In step S320, the motion estimation vector and the target prediction image of the input image of the next frame are acquired by using the target image and the input image of the next frame.

In an exemplary embodiment, after the above target image is acquired, the motion estimation may be performed by using the target image and the input image of the image of the next frame to acquire the motion estimation vector and the target prediction image of the input image of the next frame.

Figure 6:
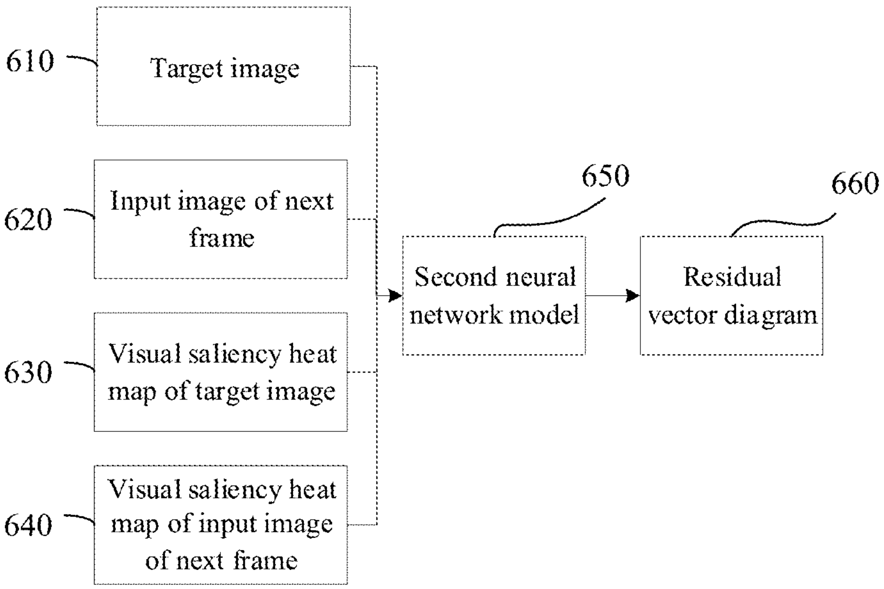
FIG. 6 schematically shows a data flow diagram of a motion estimation according to an exemplary embodiment of the present disclosure.

Specifically, referring to FIG. 6, a pre-trained second neural network model 650 may be acquired first. The second neural network model may be a CNN network model based on multi-scale Unet and 3D convolution. The input of the second neural network model may be the input image 620 of the next frame, the target image 610, the visual saliency heat map 640 of the input image of the next frame and the visual saliency heat map 630 of the target image. The input of the second neural network model is a residual vector diagram of the input image of the next frame and the target image.

In an exemplary embodiment, the acquired target image, the input image of the next frame, the visual saliency heat map of the input image of the next frame and the visual saliency heat map of the target image may be input into the second neural network model to obtain the residual vector diagram of the input image of the next frame and the target image.

In an exemplary embodiment, after the above residual vector diagram is obtained, the residual vector diagram may be used to calculate the motion estimation vector between the input image of the next frame and the target image. The residual vector diagram includes motion process between the target image and the input image of the next frame and the motion estimation vector, which is a relative displacement between the target image and the input image of the next frame and the direction of the displacement, that is, the motion information between the target image and the input image of the next frame.

In an exemplary embodiment, the target prediction image of the image of the next frame may be acquired according to the target image and the above motion estimation vector. The second neural network model is input with a pixel-level residual vector diagram, that is, each pixel may correspond to a set of inter-frame motion residuals, therefore, when frame prediction and motion compensation are performed according to the residual vector diagram output by the model, the accuracy of the obtained reconstruction image frame is relatively higher, and the pixel motion transition between frames is smoother.

In another exemplary embodiment of the present disclosure, the target prediction image may be obtained in an inter-frame prediction of the image of the next frame. The specific details of the inter-frame prediction are already relatively conventional in the related art, which are repeated herein.

It should be noted that both the above first neural network model and the second neural network model may be based on a feedforward neural network. The feedforward network may be implemented as an acyclic graph, where nodes are arranged in layers. Generally, a feedforward network topology includes an input layer and an output layer, and the input layer and the output layer are separated by at least one hidden layer. The hidden layer transforms the input received by the input layer into a useful representation for generating output in the output layer. Network nodes are fully connected to nodes in an adjacent layer via an edge, but there is no edge between nodes within each layer. The data received at the nodes of the input layer of the feedforward network is propagated (i.e., "feedforward") to the nodes of the output layer via an activation function, which calculates the state of the node of each continuous layer in the network based on coefficients ("weights"). The coefficients are respectively associated with each of the edges connecting these layers. The first neural network model and the second neural network model may also include other neural network models, for example, a recurrent neural network (RNN) model, a generative adversarial network (GAN) model, which is not limited thereto, and other neural network models well-known to those skilled in the art may also be used.

In an exemplary embodiment, the above first neural network model and second neural network model are obtained through training. Specifically, the following steps may be included: selecting a network topology; using a set of training data representing a problem modeled by the network; and adjusting weights until the network model appears to have the smallest error for all instances of the training data set. For example, during a supervised learning training process for the neural network, the output produced by the network in response to the input representing the instance in the training data set is compared with the "correct" labeled output of the instance; an error signal representing a difference between the output and the labeled output is calculated; and when the error signal is propagated backwards through the layers of the network, the weights associated with the connection are adjusted to minimize the error.

In step S330, the difference image between the input image of the next frame and the target prediction image and the motion estimation vector are encoded.

In an exemplary embodiment, after the target prediction image is obtained, the difference image may be obtained by subtracting the target prediction image from the input image of the next frame, and the obtained difference image and the above motion estimation vector may be encoded. The encoding includes transformation and quantization. The specific details of the transformation and quantization have been described in detail above, which will not be repeated herein.

Figure 7:
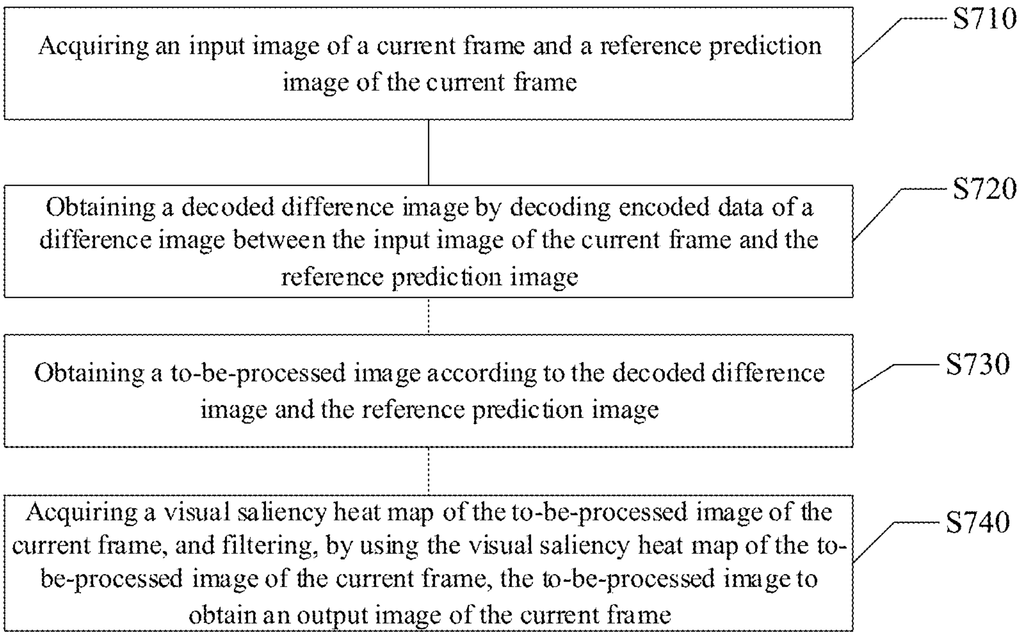
FIG. 7 schematically shows a flowchart of an image decoding method according to an exemplary embodiment of the present disclosure.

The present disclosure also provides a decoding method. As shown in FIG. 7, the decoding method may include:

- step S710, acquiring an input image of a current frame and a reference prediction image of the current frame;
- step S720, obtaining a decoded difference image by decoding encoded data of a difference image between the input image of the current frame and the reference prediction image;
- step S730, obtaining a to-be-processed image according to the decoded difference image and the reference prediction image; and
- step S740, acquiring a visual saliency heat map of the to-be-processed image of the current frame, and filtering, by using the visual saliency heat map of the to-be-processed image of the current frame, the to-be-processed image to obtain an output image of the current frame.

The above steps are described in detail below.

In step S710, the reference prediction image of the current frame is acquired.

In an exemplary embodiment of the present disclosure, a processor may first obtain the reference prediction image of the current frame, and the reference prediction image of the current frame may be obtained by using an output image of a previous frame and a motion estimation vector of the previous frame.

In an exemplary embodiment, since the decoding of the image of the previous frame has been completed, the output image of the image of the previous frame and the motion estimation vector between the image of the previous frame and image of the current frame may be obtained, and then the reference prediction image of the current frame may be obtained by using motion compensation according to the motion estimation vector and the output image of the previous frame.

In step S720, the decoded difference image is obtained by decoding the encoded data of the difference image between the input image of the current frame and the reference prediction image.

In an exemplary embodiment of the present disclosure, after the reference prediction image of the current frame is obtained, the encoded data of the difference image between the input image and the reference prediction image is decoded to obtain the decoded difference image. The difference image is the input to-be-processed image. The step S730 may be performed after the decoded difference image is obtained. The decoding process includes inverse transformation and inverse quantization. The specific details of the inverse transformation and inverse quantization have been described in detail in the above image encoding method, which will not be repeated herein.

In step S730, the to-be-processed image is obtained according to the decoded difference image and the reference prediction image.

In step S740, the visual saliency heat map of the to-be-processed image of the current frame is acquired, and the to-be-processed image is filtered by using the visual saliency heat map of the to-be-processed image of the current frame to obtain the output image of the current frame.

In an exemplary embodiment, the above decoded difference image and the reference prediction image may be added to obtain the above to-be-processed image, then the saliency heat map of the above to-be-processed image may be obtained, and the to-be-processed image is filtered by using the visual saliency heat map of the to-be-processed image of the current frame to obtain the output image of the current frame.

Specifically, in an exemplary embodiment, referring to FIG. 4, the input of the first neural network model 430 is a brightness value of the to-be-processed image 410 of the current frame, and the output of the first neural network model 430 is the visual saliency heat map 440 of the to-be-processed image of the current frame. The brightness image of the to-be-processed image of the current frame may be extracted 420 through the Y channel first, i.e., the image of the Y channel is used as the input of the above first neural network model to obtain the visual saliency heat map of the to-be-processed image of the current frame. Then, the to-be-processed image of the current frame may be filtered 450 by using the visual saliency heat map of the current frame to obtain the output image 460 of the current frame.

In an exemplary embodiment, the saliency score of each area in the visual saliency heat map may be used to determine the filtering mechanism of each area in the to-be-processed image of the current frame. A low-intensity filtering mechanism may be used for the area with a higher saliency score to remain details as much as possible, and a high-intensity filtering mechanism may be used for the area with a low saliency score to remove block effects as much as possible, to avoid blurring of details, and low image clarity during video decoding due to excessive filtering of a foreground target, and to further avoid large video noise and quality degradation during video decoding.

In view of the above, in the exemplary embodiment, filtering the image by using the visual saliency heat map of the image of the current frame may improve the display effect of the obtained target image, thereby improving the accuracy of the acquired target prediction image, and improving the encoding accuracy. Further, different filtering mechanisms are used in different saliency areas during the filtering process, which avoids blurring of details, loss of encoding information, and low image clarity during video decoding due to excessive filtering of a foreground target, and which may also avoid generating too much noise in a smooth background area of the image due to insufficient filtering strength, and thus increasing redundant encoding information, reducing encoding efficiency, and causing large video noise and quality degradation during video decoding.

It should be noted that the above-mentioned drawings are only schematic illustrations of the processing included in the method according to the exemplary embodiments of the present disclosure, and are not intended for limitation. It can be understood easily that the processes shown in the above drawings do not indicate or limit the time sequence of these processes. In addition, it can be further understood easily that these processes may be executed synchronously or asynchronously in a plurality of modules, for example.

Figure 8:
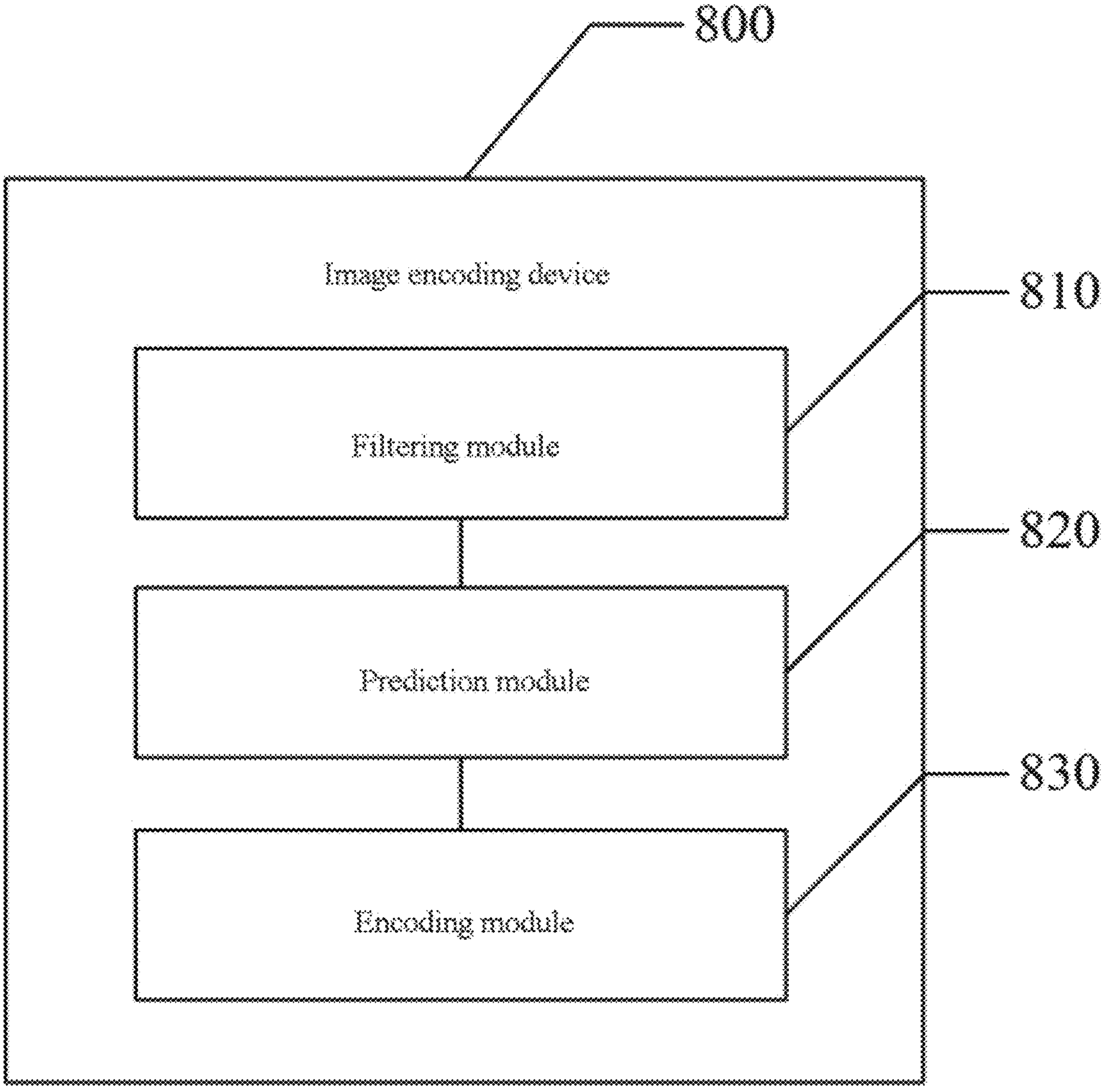
FIG. 8 schematically shows a schematic diagram of an image encoding device according to an exemplary embodiment of the present disclosure.

Further, referring to FIG. 8, an exemplary embodiment also provides an image encoding device 800, which includes a filtering module 810, a prediction module 820, and an encoding module 830.

The filtering module 810 may be configured to acquire a visual saliency heat map of an image of a current frame, and filter, by using the visual saliency heat map of the image of the current frame, the image of the current frame to obtain a target image; the prediction module 820 may be configured to acquire, by using the target image and an input image of a next frame, a motion estimation vector and a target prediction image of the input image of the next frame; and the encoding module 830 may be configured to encode a difference image between the input image of the next frame and the target prediction image and the motion estimation vector.

In an exemplary embodiment, the filtering module may include a heat map acquiring module and a deblocking filtering module. the heat map acquiring module is configured to acquire the visual saliency heat map of the image of the current frame; and the deblocking filtering module is configured to filter, by using the visual saliency heat map of the image of the current frame, the image of the current frame to obtain the target image.

In an exemplary embodiment, the heat map acquiring module may include a pre-trained first neural network model of an attention mechanism to acquire the visual saliency heat map of the image of the current frame. The method of acquiring the visual saliency heat map of the image of the current frame by using the first neural network model has been described above in detail, which will not be repeated herein.

In an exemplary embodiment, the above predicting module may include a motion estimating module and a motion compensating module. The motion estimating module is configured to obtain the motion estimation vector using the target image and the input image of the next frame; and the motion compensating module is configured to obtain the target prediction image of the input image of the next frame according to the target image and the motion estimation vector.

In an exemplary embodiment, the encoding module may include a difference module and an image encoding module. The difference module is configured to obtain the difference image between the input image of the next frame and the target prediction image; and the image encoding module is configured to encode the difference image between the input image of the next frame and the target prediction image and the motion estimation vector.

Figure 9:
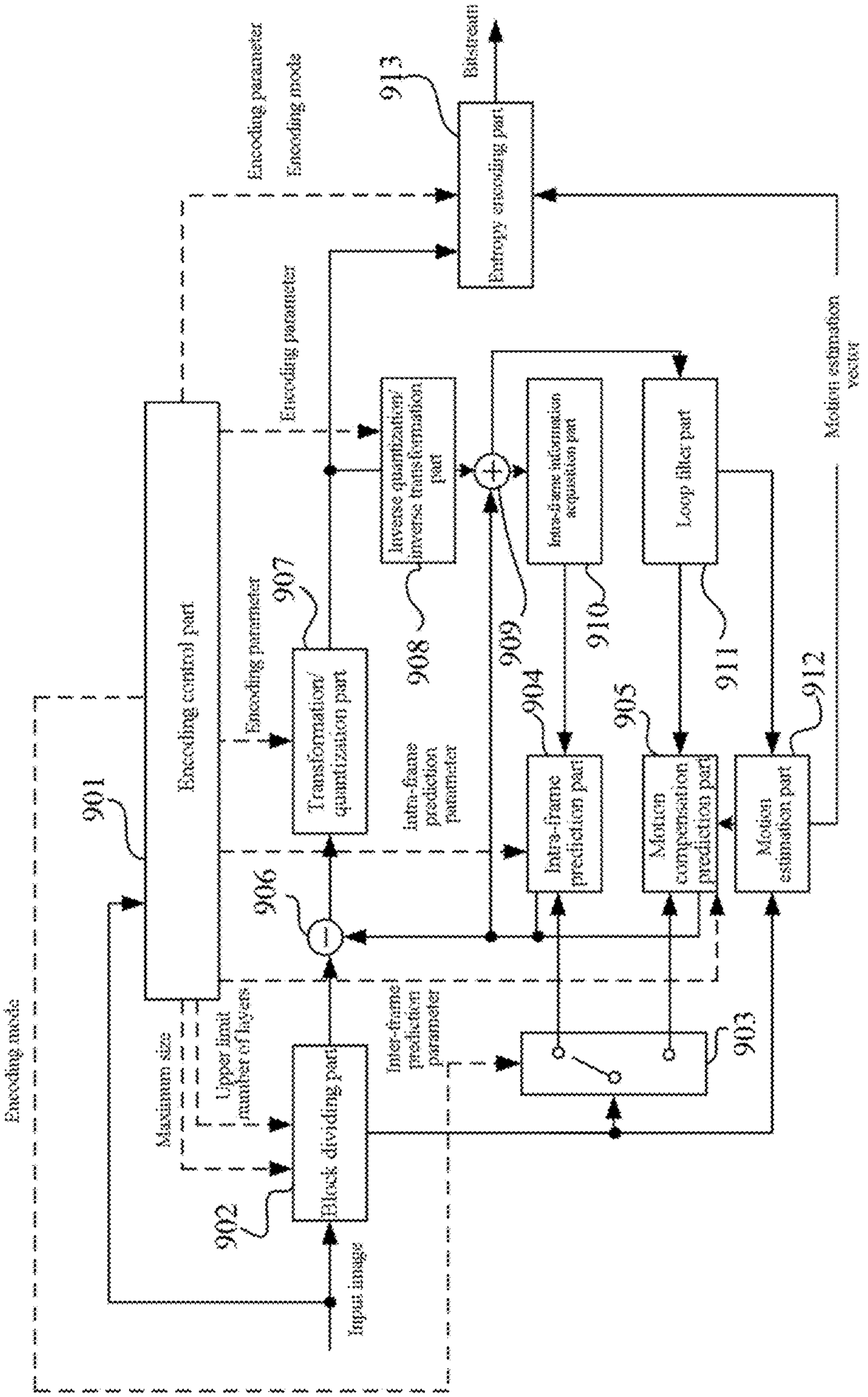
FIG. 9 schematically shows a schematic diagram of a specific structure of an image encoding device according to an exemplary embodiment of the present disclosure.

In an exemplary embodiment of the present disclosure, as shown in FIG. 9, an encoding control part 901 performs: determining a maximum size of an encoding block being a processing unit when implementing motion compensation prediction (inter-frame prediction) or intra-frame prediction, and determining the upper limit of the number of layers of the encoding block with the maximum size when being divided hierarchically. In addition, the encoding control part 901 performs: selecting, from one or more available encoding modes (one or more intra-frame encoding modes, and one or more inter-frame encoding modes), an encoding mode for the respective encoding blocks being divided hierarchically. A block dividing part 902 performs: if a video signal representing an input image is input, dividing the input image represented by the video signal into encoding blocks of the maximum size determined by the encoding control part 901, and dividing hierarchically the encoding block until the number of the layers reaches the up limit determined by the encoding control part 901.

A first switch 903 performs: if the encoding mode selected by the encoding control part 901 is the intra-frame encoding mode, outputting the encoding block divided by the block dividing part 902 to an intra-frame prediction part 904, and if the encoding control part 901 selects the inter-frame coding mode, outputting the encoding block divided by the block dividing part 902 to a motion compensation prediction part 905.

As for the implementation of the intra-frame prediction part 904, if the encoding block divided by the block dividing part 902 is received from the first switch 903, the encoding block becomes an already-coded block after a transformation/quantization part 907, an intra-frame information acquisition part 910 is used to acquire the to-be-processed image of the above already-encoded block, that is, the input of the intra-frame information acquisition part 910 is the image obtained through the already-encoded block passing through the inverse quantization/inverse transformation part 908 and an adding part, the intra-frame prediction part 904 performs the intra-frame prediction for the encoding block to generate a prediction image by referring to the to-be-processed image (reference image) of the already-encoded block and using intra-frame prediction parameters output from the encoding control part 901.

As for the implementation of the motion compensation prediction part 905, if the encoding block divided by the block dividing part 902 is received from the first switch 903, with the comparison between the encoding block and the local to-be-processed image of the already-encoded block, and with the calculation of the motion estimation vector by a motion estimation part 912, the motion compensation prediction part 905 performs the inter-frame prediction (motion compensation prediction) for the encoding block to generate the prediction image by using the motion estimation vector and the inter-frame prediction parameter output from the encoding control part 901. The encoding block becomes the already-encoded block after passing through the transformation/quantization part 907, and the to-be-processed image is obtained after the already-encoded block passing through the inverse quantization/inverse transformation part 908 and the adding part.

The motion estimation part 912 may be a motion estimation module, and the motion compensation prediction part 905 may be a motion compensation module. The prediction module includes the motion compensation prediction part 905 and the intra-frame prediction part 904.

A subtraction part 906 performs: generating a difference image (=encoding block-prediction image) by subtracting the prediction image generated by the intra-frame prediction part 904 or the motion compensation prediction part 905 from the encoding block divided by the block dividing part 902.

The transformation/quantization part 907 performs: according to the size unit of the transformation block included in the encoding parameter output from the encoding control part 901, performing transformation processing (for example, discrete cosine transformation (DCT), KL transformation in which a basic design is pre-made for a specific learning series, and other orthogonal transformation processing) on the difference image generated by the subtraction part 906, and quantizing the transformation coefficient of the difference image by using the quantization parameter contained in the encoding parameter, thereby outputting the quantized transformation coefficient as the compressed data of the difference image. The encoding module includes the subtraction part 906 and the transformation/quantization part 907.

The inverse quantization/inverse transformation part 908 performs: performing the inverse quantization on the compressed data output from the transformation/quantization part 907 by using the quantization parameter included in the encoding parameter output from the encoding control part 901, and according to the size unit of the transformation block included in the encoding parameter, performing the inverse transformation processing (for example, inverse discrete cosine transformation (inverse DCT), inverse KL transformation and the like) on the compressed data to which the inverse quantization has been applied, thereby outputting the compressed data after inverse transformation processing as a local decoded prediction difference signal (representing the data of the decompressed difference image).

The adding part 909 performs: adding the to-be-processed image output from the inverse quantization/inverse transformation part and the prediction image generated by the intra-frame prediction part 904 or the motion compensation prediction part 905 to generate the target image.

A loop filter part 911 performs: filtering (loop filtering) the to-be-processed image generated by the adding part 909 to remove distortion (block distortion) at the block boundary.

When the loop filter part 911 removes the block distortion of the local to-be-processed image, corresponding to the encoding mode (intra-frame encoding mode, inter-frame encoding mode) selected by the encoding control part 901, the filtering strength for removing the block distortion is set according to the signal component (luminance signal component, color difference signal component). The above filtering module includes the loop filter part.

The above encoding module may further include an entropy encoding part 913 that performs: performing a variable-length encoding on the compressed data output from the transformation/quantization part 907, the encoding mode and encoding parameters output from the encoding control part 901, and the intra-frame prediction parameters output from the intra-frame prediction part 904 or the inter-frame prediction parameters (including the motion estimation vector) output from the motion compensation prediction part 905 to generate a bitstream of the encoding data multiplexing the compressed data, encoding mode, prediction difference encoding parameters, intra-frame prediction parameters/inter-frame prediction parameters.

It devises that the encoding control part 901, the block division part 902, the first switch 903, the intra-frame prediction part 904, the motion compensation prediction part 905, the subtraction part 906, the transformation/quantization part 907, the inverse quantization/inverse transformation part 908, the adding part 909, the intra-frame information acquisition part 910, the loop filter part 911, the motion estimation part 912, and the entropy encoding part 913, which are constituting elements of the image encoding device, are each composed of a dedicated hardware (for example, a semiconductor integrated circuit with a CPU, or a single-chip microcomputer). However, when the image encoding device is constituted by a computer, programs describing the processing contents of the encoding control part 901, the block division part 902, the first switch 903, the intra-frame prediction part 904, the motion compensation prediction part 905, the subtraction part 906, the transformation/quantization part 907, the inverse quantization/inverse transformation part 908, the adding part 909, the intra-frame information acquisition part 910, the loop filter part 911, the motion estimation part 912, and the entropy encoding part 913 may be saved in a memory of the computer, and the CPU of the computer executes the programs saved in the memory.

The specific details of each module in the above-mentioned device have been described in detail in the method embodiments, and the undisclosed details may refer to the method embodiments, which will not be repeated herein.

Figure 10:
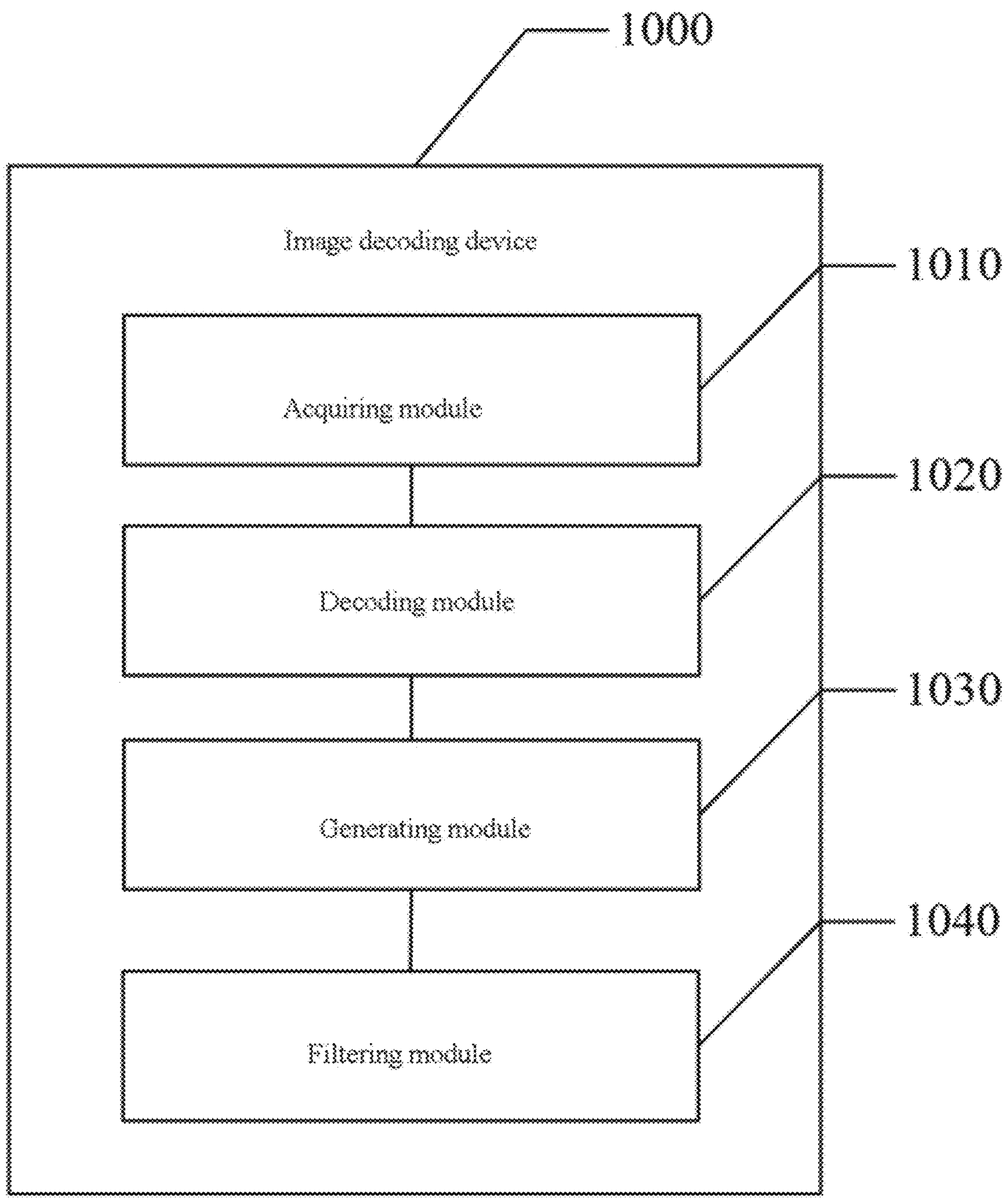
FIG. 10 schematically shows a schematic diagram of an image decoding device according to an exemplary embodiment of the present disclosure.

Referring to FIG. 10, the present disclosure also provides an image decoding device 1000, including an acquiring module 1010, a decoding module 1020, a generating module 1030, and a filtering module 1040. The acquiring module 1010 is configured to acquire a reference prediction image of a current frame; the decoding module 1020 is configured to obtain a decoded difference image by decoding encoded data of a difference image between an input image of the current frame and the reference prediction image; the generating module 1030 is configured to obtain a to-be-processed image according to the decoded difference image and the reference prediction image; and the filtering module 1040 is configured to acquire a visual saliency heat map of the to-be-processed image of the current frame, and filter, by using the visual saliency heat map of the to-be-processed image of the current frame, the to-be-processed image to obtain an output image of the current frame.

It should be noted that the filtering module in the image decoding device and the image encoding device described above may be the same module or different modules, which are not specifically limited in the exemplary embodiment.

In an exemplary embodiment, the filtering module includes a heat map acquiring module and a deblocking filtering module. The heat map acquiring module is configured to acquire the saliency heat map of the to-be-processed image of the current frame; and the deblocking filtering module is configured to filter, by using the visual saliency heat map of the to-be-processed image of the current frame, to obtain the output image of the current frame.

Specifically, the heat map acquiring module may include the pre-trained first neural network model 430 of the attention mechanism. As shown in FIG. 4, the input of the first neural network model 430 is a brightness value of the to-be-processed image 410 of the current frame, and the output of the first neural network model 430 may be the visual saliency heat map 440 of the to-be-processed image of the current frame. The brightness image of the to-be-processed image of the current frame may be extracted 420 through the Y channel first, and then the brightness value is input to the above-mentioned first neural network model to obtain the visual saliency heat map of the to-be-processed image of the current frame. Then, the to-be-processed image of the current frame may be filtered 450 by using the visual saliency heat map of the current frame to obtain the output image 460 of the current frame.

In an exemplary embodiment, the saliency score of each area in the visual saliency heat map may be used to determine the filtering mechanism of each area in the to-be-processed image of the current frame. A low-intensity filtering mechanism may be used for the area with a higher saliency score to remain details as much as possible, and a high-intensity filtering mechanism may be used for the area with a low saliency score to remove block effects as much as possible, to avoid blurring of details, loss of encoding information, and low image clarity during video decoding due to excessive filtering of a foreground target, and to further avoid large video noise and quality degradation during video decoding.

Figure 11:
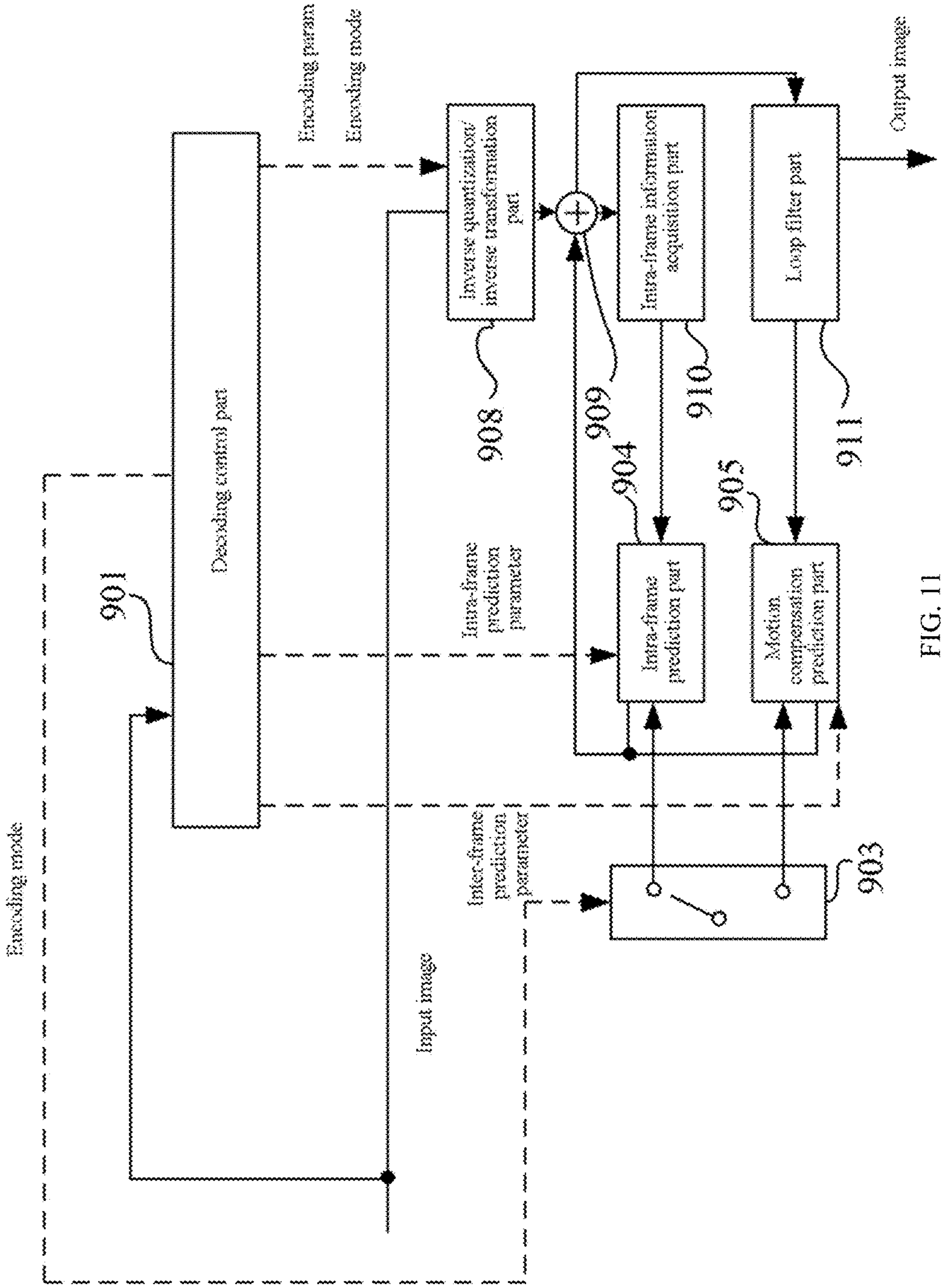
FIG. 11 schematically shows a schematic diagram of a specific structure of an image decoding device according to an exemplary embodiment of the present disclosure.

In an exemplary embodiment of the present disclosure, as shown in FIG. 11, an encoding control part 901 performs: determining a maximum size of an encoding block being a processing unit when implementing motion compensation prediction (inter-frame prediction) or intra-frame prediction, and determining the upper limit of the number of layers of the encoding block with the maximum size when being divided hierarchically. In addition, the encoding control part 901 performs: selecting, from one or more available encoding modes (one or more intra-frame encoding modes, and one or more inter-frame encoding modes), an encoding mode for the respective encoding blocks being divided hierarchically.

A first switch 903 performs: if the encoding mode selected by the encoding control part 901 is the intra-frame encoding mode, outputting the encoding block divided by the block dividing part 902 to an intra-frame prediction part 904, and if the encoding control part 901 selects the inter-frame coding mode, outputting the encoding block divided by the block dividing part 902 to a motion compensation prediction part 905.

As for the implementation of the intra-frame prediction part 904, if the encoding block divided by the block dividing part 902 is received from the first switch 903, an intra-frame information acquisition part 910 is used to acquire the to-be-processed image of the above already-encoded block, that is, the input of the intra-frame information acquisition part 910 is the image obtained through the already-encoded block passing through the inverse quantization/inverse transformation part 908 and an adding part, the intra-frame prediction part 904 performs the intra-frame prediction for the encoding block to generate a prediction image by referring to the to-be-processed image (reference image) of the already-encoded block and using intra-frame prediction parameters output from the encoding control part 901.

As for the implementation of the motion compensation prediction part 905, if the encoding block divided by the block dividing part 902 is received from the first switch 903, with the comparison between the encoding block and the local to-be-processed image of the already-encoded block, and with the calculation of the motion estimation vector by a motion estimation part 912, the motion compensation prediction part 905 performs the inter-frame prediction (motion compensation prediction) for the encoding block to generate the prediction image by using the motion estimation vector and the inter-frame prediction parameter output from the encoding control part 901. The encoding block becomes the already-encoded block after passing through the transformation/quantization part 907, and the to-be-processed image is obtained after the already-encoded block passing through the inverse quantization/inverse transformation part 908 and the adding part.

In the decoding device, the above acquiring module includes the above motion compensation prediction part 905 and the above intra-frame prediction part 904.

The inverse quantization/inverse transformation part performs: performing the inverse quantization on the input compressed data by using the quantization parameter included in the encoding parameter output from the encoding control part 901, and according to the size unit of the transformation block included in the encoding parameter, performing the inverse transformation processing (for example, inverse discrete cosine transformation (inverse DCT), inverse KL transformation and the like) on the compressed data to which the inverse quantization has been applied, thereby outputting the compressed data after inverse transformation processing as a local decoded prediction difference signal (representing the data of the decompressed difference image).

The decoding module in the image decoding device includes the above inverse quantization/inverse transformation part 908.

The adding part 909 performs: adding the to-be-processed image output from the inverse quantization/inverse transformation part and the prediction image generated by the intra-frame prediction part 904 or the motion compensation prediction part 905 to generate the target image.

A loop filter part 911 performs: filtering (loop filtering) the to-be-processed image generated by the adding part 909 to remove distortion (block distortion) at the block boundary.

When the loop filter part 911 removes the block distortion of the local to-be-processed image, corresponding to the encoding mode (intra-frame encoding mode, inter-frame encoding mode) selected by the encoding control part 901, the filtering strength for removing the block distortion is set according to the signal component (luminance signal component, color difference signal component).

The filtering module in the above decoding device includes the loop filter part 911.

It devises that the encoding control part 901, the first switch 903, the intra-frame prediction part 904, the motion compensation prediction part 905, the inverse quantization/inverse transformation part 908, the adding part 909, the intra-frame information acquisition part 910, and the loop filter part 911, which are constituting elements of the image encoding device, are each composed of a dedicated hardware (for example, a semiconductor integrated circuit with a CPU, or a single-chip microcomputer). However, when the image encoding device is constituted by a computer, programs describing the processing contents of the encoding control part 901, the block division part 902, the first switch 903, the intra-frame prediction part 904, the motion compensation prediction part 905, the inverse quantization/inverse transformation part 908, the adding part 909, the intra-frame information acquisition part 910, and the loop filter part 911 may be saved in a memory of the computer, and the CPU of the computer executes the programs saved in the memory.

The specific details of each module in the above-mentioned device have been described in detail in the method embodiments, and the undisclosed details may refer to the method embodiments, which will not be repeated herein.

Figure 12:
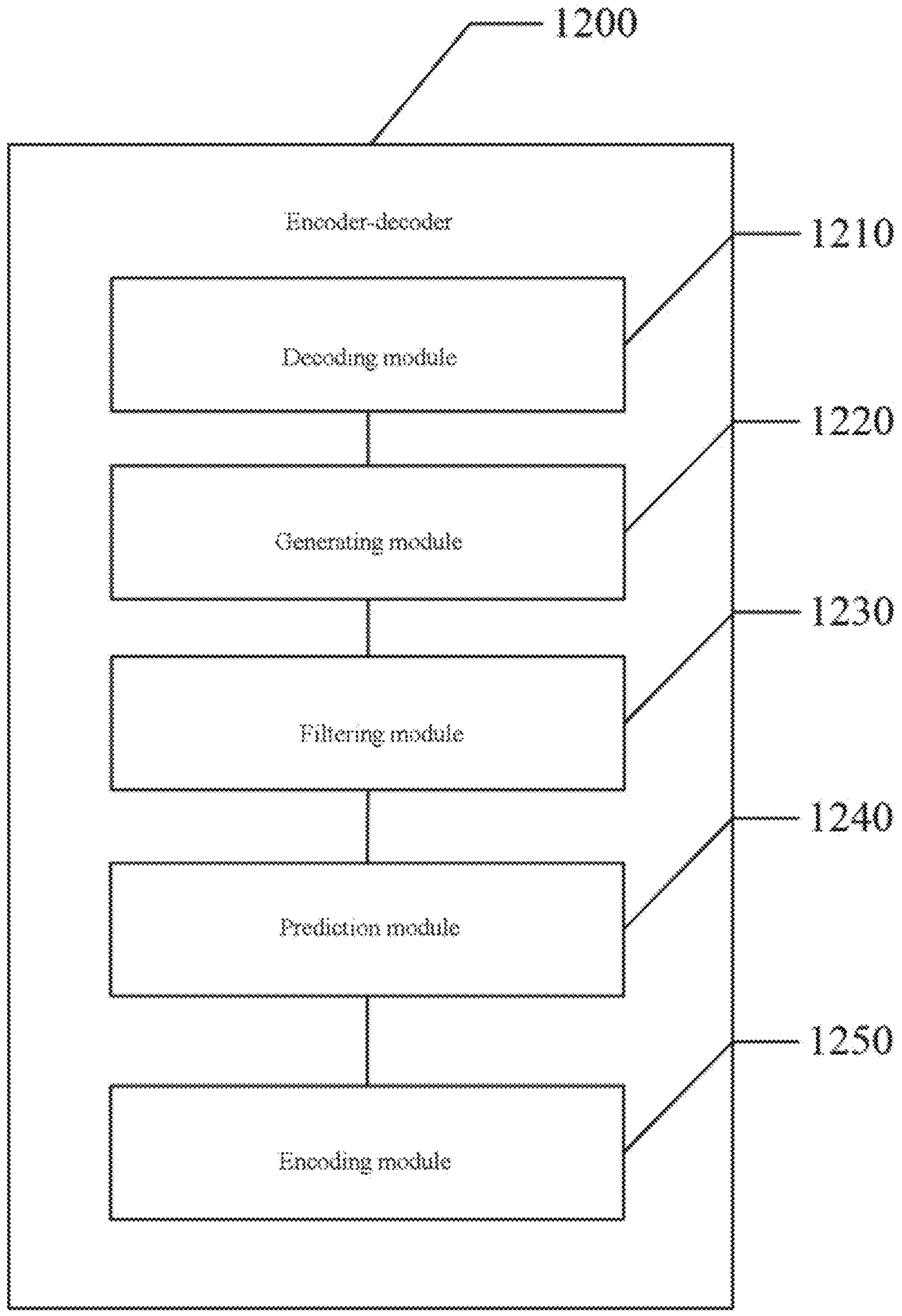
FIG. 12 schematically shows a schematic diagram of an image coder-decoder according to an exemplary embodiment of the present disclosure.

Referring to FIG. 12, the present disclosure also provides an encoder-decoder 1200, including a decoding module 1210, a generating module 1220, a filtering module 1230, a prediction module 1240, and an encoding module 1250. The decoding module 1210 is configured to obtain a decoded difference image by decoding encoded data of a difference image between an input image of a current frame and a reference prediction image of the current frame; the generating module 1220 is configured to obtain a to-be-processed image according to the decoded difference image and the reference prediction image; the filtering module 1230 is configured to acquire a visual saliency heat map of the to-be-processed image of the current frame, and filter, by using the visual saliency heat map of the to-be-processed image of the current frame, the to-be-processed image to obtain a target image; the prediction module 1240 is configured to acquire, by using the target image and an input image of a next frame, a motion estimation vector and a target prediction image of the input image of the next frame; and the encoding module 1250 is configured to encode a difference image between the input image of the next frame and the target prediction image and the motion estimation vector.

The specific details of each module in the above-mentioned device have been described in detail in the method embodiments, and the undisclosed details may refer to the method embodiments, which will not be repeated herein.

Figure 13:
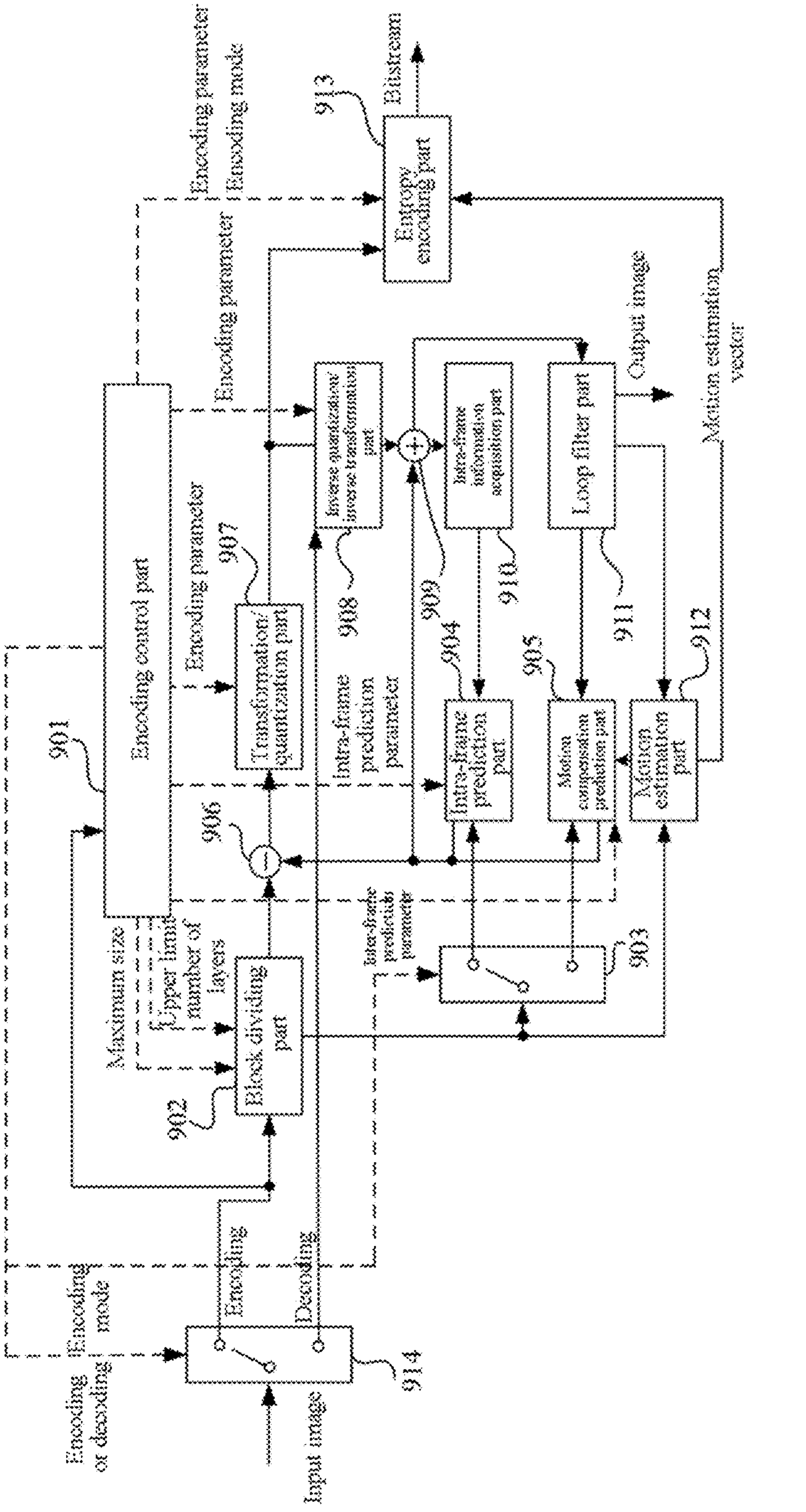
FIG. 13 schematically shows a schematic diagram of a specific structure of an image coder-decoder according to an exemplary embodiment of the present disclosure.

In an exemplary embodiment of the present disclosure, as shown in FIG. 13, an encoding control part 901 performs: determining a maximum size of an encoding block being a processing unit when implementing motion compensation prediction (inter-frame prediction) or intra-frame prediction, and determining the upper limit of the number of layers of the encoding block with the maximum size when being divided hierarchically. In addition, the encoding control part 901 performs: selecting, from one or more available encoding modes (one or more intra-frame encoding modes, and one or more inter-frame encoding modes), an encoding mode for the respective encoding blocks being divided hierarchically. A block dividing part 902 performs: if a video signal representing an input image is input, dividing the input image represented by the video signal into encoding blocks of the maximum size determined by the encoding control part 901, and dividing hierarchically the encoding block until the number of the layers reaches the up limit determined by the encoding control part 901.

A second switch 914 is used to determine whether the working mode of the encoder-decoder is encoding or decoding. If the second switch 914 directs the data to the block dividing part 902, the working state of the encoder-decoder is encoding; and if the second switch 914 directs the data directly to the inverse transformation/inverse quantization part, the working state of the encoder-decoder is decoding.

A first switch 903 performs: if the encoding mode selected by the encoding control part 901 is the intra-frame encoding mode, outputting the encoding block divided by the block dividing part 902 to an intra-frame prediction part 904, and if the encoding control part 901 selects the inter-frame coding mode, outputting the encoding block divided by the block dividing part 902 to a motion compensation prediction part 905.

As for the implementation of the intra-frame prediction part 904, if the encoding block divided by the block dividing part 902 is received from the first switch 903, the encoding block becomes an already-coded block after a transformation/quantization part 907, an intra-frame information acquisition part 910 is used to acquire the to-be-processed image of the above already-encoded block, that is, the input of the intra-frame information acquisition part 910 is the image obtained through the already-encoded block passing through the inverse quantization/inverse transformation part 908 and an adding part, the intra-frame prediction part 904 performs the intra-frame prediction for the encoding block to generate a prediction image by referring to the to-be-processed image (reference image) of the already-encoded block and using intra-frame prediction parameters output from the encoding control part 901.

As for the implementation of the motion compensation prediction part 905, if the encoding block divided by the block dividing part 902 is received from the first switch 903, with the comparison between the encoding block and the local to-be-processed image of the already-encoded block, and with the calculation of the motion estimation vector by a motion estimation part 912, the motion compensation prediction part 905 performs the inter-frame prediction (motion compensation prediction) for the encoding block to generate the prediction image by using the motion estimation vector and the inter-frame prediction parameter output from the encoding control part 901. The encoding block becomes the already-encoded block after passing through the transformation/quantization part 907, and the to-be-processed image is obtained after the already-encoded block passing through the inverse quantization/inverse transformation part 908 and the adding unit. The above prediction module includes the above motion compensation prediction part 905 and the intra-frame prediction part 904.

A subtraction part 906 performs: generating a difference image (encoding block-prediction image) by subtracting the prediction image generated by the intra-frame prediction part 904 or the motion compensation prediction part 905 from the encoding block divided by the block dividing part 902.

The transformation/quantization part 907 performs: according to the size unit of the transformation block included in the encoding parameter output from the encoding control part 901, performing transformation processing (for example, discrete cosine transformation (DCT), KL transformation in which a basic design is pre-made for a specific learning series, and other orthogonal transformation processing) on the difference image generated by the subtraction part 906, and quantizing the transformation coefficient of the difference image by using the quantization parameter contained in the encoding parameter, thereby outputting the quantized transformation coefficient as the compressed data of the difference image.

The above encoding module includes the subtraction part 906 and the transformation/quantization part 907.

The inverse quantization/inverse transformation part 908 performs: performing the inverse quantization on the compressed data output from the transformation/quantization part 907 by using the quantization parameter included in the encoding parameter output from the encoding control part 901, and according to the size unit of the transformation block included in the encoding parameter, performing the inverse transformation processing (for example, inverse discrete cosine transformation (inverse DCT), inverse KL transformation and the like) on the compressed data to which the inverse quantization has been applied, thereby outputting the compressed data after inverse transformation processing as a local decoded prediction difference signal (representing the data of the decompressed difference image).

The above decoding module includes an inverse quantization/inverse transformation part 908.

The adding part 909 performs: adding the to-be-processed image output from the inverse quantization/inverse transformation part and the prediction image generated by the intra-frame prediction part 904 or the motion compensation prediction part 905 to generate the target image. The above generating module includes the adding part 909.

A loop filter part 911 performs: filtering (loop filtering) the to-be-processed image generated by the adding part 909 to remove distortion (block distortion) at the block boundary.

When the loop filter part 911 removes the block distortion of the local to-be-processed image, corresponding to the encoding mode (intra-frame encoding mode, inter-frame encoding mode) selected by the encoding control part 901, the filtering strength for removing the block distortion is set according to the signal component (luminance signal component, color difference signal component).

The above filtering module includes the loop filter part 911.

An entropy encoding part performs: performing a variable-length encoding on the compressed data output from the transformation/quantization part 907, the encoding mode and encoding parameters output from the encoding control part 901, and the intra-frame prediction parameters output from the intra-frame prediction part 904 or the inter-frame prediction parameters (including the motion estimation vector) output from the motion compensation prediction part 905 to generate a bitstream of the encoding data multiplexing the compressed data, encoding mode, prediction difference encoding parameters, intra-frame prediction parameters/inter-frame prediction parameters.

It devises that the encoding control part 901, the block division part 902, the first switch 903, the intra-frame prediction part 904, the motion compensation prediction part 905, the subtraction part 906, the transformation/quantization part 907, the inverse quantization/inverse transformation part 908, the adding part 909, the intra-frame information acquisition part 910, the loop filter part 911, the motion estimation part 912, and the entropy encoding part 913, which are constituting elements of the image encoding device, are each composed of a dedicated hardware (for example, a semiconductor integrated circuit with a CPU, or a single-chip microcomputer). However, when the image encoding device is constituted by a computer, programs describing the processing contents of the encoding control part 901, the block division part 902, the first switch 903, the intra-frame prediction part 904, the motion compensation prediction part 905, the subtraction part 906, the transformation/quantization part 907, the inverse quantization/inverse transformation part 908, the adding part 909, the loop filter part 911, the motion estimation part 912, and the entropy encoding part 913 may be saved in a memory of the computer, and the CPU of the computer executes the programs saved in the memory.

Those skilled in the art may understand that various aspects of the present disclosure may be implemented as a system, a method, or a program product. Therefore, various aspects of the present disclosure may be specifically implemented in the following forms, namely: a complete hardware, a complete software (including a firmware, a microcode, and the like), or a combination of hardware and software, which may be collectively referred to as "circuit", "module" or "system" herein.

Exemplary embodiments of the present disclosure also provide a computer-readable storage medium having a program product stored thereon which is capable of implementing the above-mentioned method in the specification. In some possible implementations, various aspects of the present disclosure may also be implemented in the form of a program product, which includes program code. When the program product runs on a terminal device, the program code causes the terminal device to execute the steps described in the above exemplary method according to various embodiments of the present disclosure.

It should be noted that the computer-readable medium shown in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, device, or apparatus, or any combination thereof. More specific examples of computer-readable storage media may include, but are not limited to: electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof.

In the present disclosure, the computer-readable storage medium may be any tangible medium that contains or stores a program, and the program may be used by or in combination with an instruction execution system, apparatus, or device. In the present disclosure, the computer-readable signal medium may include a data signal propagated in a baseband or as a part of a carrier wave, in which a computer-readable program code is carried. Such propagated data signal may take many forms, including but not limited to electromagnetic signals, optical signals, or any suitable combination thereof. The computer-readable signal medium may also be any computer-readable medium other than the computer-readable storage medium, and such computer-readable medium can send, propagate, or transmit the program for being used by or in combination with the instruction execution system, apparatus, or device. The program code contained on the computer-readable medium may be transmitted by any suitable medium, including but not limited to: wireless, wire, optical cable, RF or any suitable combination thereof.

In addition, the program code for performing the operations of the present disclosure may be written in any combination of one or more programming languages. The programming languages include object-oriented programming languages, such as Java, C++, and further include conventional procedural programming languages, such as "C" language or similar programming language. The program code may be executed entirely on a user's computing device, executed partly on a user's device, executed as an independent software package, executed partly on the user's computing device and partly on a remote computing device, or executed entirely on the remote computing device or server. In the case relating to the remote computing device, the remote computing device may be connected to the user computing device through any kind of network, including a local area network (LAN) or a wide area network (WAN), or may be connected to an external computing device (for example, through the Internet of an internet service provider).

Those skilled in the art will easily conceive of other embodiments of the present disclosure after considering the specification and practicing the invention disclosed herein. The present application is intended to cover any variations, uses, or adaptive changes of the present disclosure, which follow the general principles of the present disclosure and include the common knowledge or conventional technical means in the technical field that are not disclosed in the present disclosure. The description and the embodiments are only regarded as exemplary, and the true scope and spirit of the present disclosure are pointed out by the claims.

It should be understood that the present disclosure is not limited to the precise structure that has been described above and shown in the drawings, and various modifications and changes may be made without departing from the scope thereof. The scope of the present disclosure is limited only by the appended claims.

What is claimed is:

1. A computer-implemented image encoding method, comprising:

acquiring a visual saliency heat map of an image of a current frame, and filtering, by using the visual saliency heat map of the image of the current frame, the image of the current frame to obtain a target image;

acquiring, by using the target image and an input image of a next frame, a motion estimation vector and a target prediction image of the input image of the next frame; and encoding a difference image between the input image of the next frame and the target prediction image and the motion estimation vector, wherein filtering, by using the visual saliency heat map of the image of the current frame, the image of the current frame to obtain the target image comprises:

determining a saliency score of each area in the visual saliency heat map of the image of the current frame;

determining a filtering mechanism of each area of the image of the current frame according to the saliency score; and filtering the image of the current frame according to the filtering mechanism of each area to obtain the target image, wherein acquiring the visual saliency heat map of the image of the current frame comprises:

acquiring a pre-trained first neural network model of an attention mechanism;

extracting brightness information of the image of the current frame; and obtaining the visual saliency heat map by inputting the brightness information into the first neural network model of the attention mechanism.

2. The method according to claim 1, wherein the image of the current frame is an input image of the current frame.

3. The method according to claim 1, wherein the image of the current frame is a to-be-processed image of an input image of the current frame.

4. The method according to claim 3, wherein acquiring the to-be-processed image of the current frame comprises:

acquiring the input image of the current frame and a reference prediction image of the current frame;

decoding encoded data of a difference image between the input image and the reference prediction image of the current frame to obtain a decoded difference image; and obtaining the to-be-processed image according to the decoded difference image and the reference prediction image.

5. The method according to claim 4, wherein acquiring the reference prediction image of the current frame comprises:

performing, by using a to-be-processed image of a previous frame and the input image of the current frame, motion estimation to obtain the reference prediction image of the current frame.

6. The method according to claim 1, wherein acquiring, by using the target image and the input image of the next frame, the motion estimation vector and the target prediction image of the input image of the next frame comprises:

acquiring a pre-trained second neural network model;

acquiring a visual saliency heat map of the input image of the next frame and a visual saliency heat map of the target image;

obtaining a residual vector diagram of the input image of the next frame and the target image by inputting the input image of the next frame, the target image, the visual saliency heat map of the input image of the next frame and the visual saliency heat map of the target image into the second neural network model;

calculating the motion estimation vector according to the residual vector diagram; and obtaining the target prediction image of the input image of the next frame according to the target image and the motion estimation vector.

7. A computer-implemented image decoding method, comprising:

acquiring a reference prediction image of a current frame;

obtaining a decoded difference image by decoding encoded data of a difference image between an input image of the current frame and the reference prediction image;

obtaining a to-be-processed image according to the decoded difference image and the reference prediction image; and acquiring a visual saliency heat map of the to-be-processed image of the current frame, and filtering, by using the visual saliency heat map of the to-be-processed image of the current frame, the to-be-processed image to obtain an output image of the current frame, wherein filtering, by using the visual saliency heat map of the to-be-processed image of the current frame, the to-be-processed image to obtain the output image of the current frame comprises:

determining a saliency score of each area in the visual saliency heat map of the to-be-processed image of the current frame;

determining a filtering mechanism of each area of the to-be-processed image of the current frame according to the saliency score; and filtering the to-be-processed image of the current frame according to the filtering mechanism of each area to obtain the output image, wherein acquiring the visual saliency heat map of the to-be-processed image of the current frame comprises:

obtaining a pre-trained first neural network model of an attention mechanism;

extracting brightness information of the to-be-processed image of the current frame; and obtaining the visual saliency heat map by inputting the brightness information into the first neural network model of the attention mechanism.

8. The method according to claim 7, wherein acquiring the reference prediction image of the current frame comprises:

acquiring the reference prediction image by using an output image of a previous frame and the motion estimation vector of the output image of the previous frame and the input image of the current frame.

9. An image encoding device, comprising:

a processor; and a memory, having a computer program stored thereon that, when being executed by the processor, causes the processor to:

acquire a visual saliency heat map of an image of a current frame, and filter, by using the visual saliency heat map of the image of the current frame, the image of the current frame to obtain a target image;

acquire, by using the target image and an input image of a next frame, a motion estimation vector and a target prediction image of the input image of the next frame; and encode a difference image between the input image of the next frame and the target prediction image and the motion estimation vector, wherein filtering, by using the visual saliency heat map of the image of the current frame, the image of the current frame to obtain the target image comprises:

determining a saliency score of each area in the visual saliency heat map of the image of the current frame;

determining a filtering mechanism of each area of the image of the current frame according to the saliency score; and filtering the image of the current frame according to the filtering mechanism of each area to obtain the target image, wherein acquiring the visual saliency heat map of the image of the current frame comprises:

acquiring a pre-trained first neural network model of an attention mechanism;

extracting brightness information of the image of the current frame; and obtaining the visual saliency heat map by inputting the brightness information into the first neural network model of the attention mechanism.

10. The device according to claim 9, wherein the image of the current frame is an input image of the current frame.

11. The device according to claim 9, wherein the image of the current frame is a to-be-processed image of an input image of the current frame.

12. The device according to claim 11, wherein acquiring the to-be-processed image of the current frame comprises:

acquiring the input image of the current frame and a reference prediction image of the current frame;

decoding encoded data of a difference image between the input image and the reference prediction image of the current frame to obtain a decoded difference image; and obtaining the to-be-processed image according to the decoded difference image and the reference prediction image.

13. The device according to claim 12, wherein acquiring the reference prediction image of the current frame comprises:

performing, by using a to-be-processed image of a previous frame and the input image of the current frame, motion estimation to obtain the reference prediction image of the current frame.

14. The device according to claim 9, wherein acquiring, by using the target image and the input image of the next frame, the motion estimation vector and the target prediction image of the input image of the next frame comprises:

acquiring a pre-trained second neural network model;

acquiring a visual saliency heat map of the input image of the next frame and a visual saliency heat map of the target image;

obtaining a residual vector diagram of the input image of the next frame and the target image by inputting the input image of the next frame, the target image, the visual saliency heat map of the input image of the next frame and the visual saliency heat map of the target image into the second neural network model;

calculating the motion estimation vector according to the residual vector diagram; and obtaining the target prediction image of the input image of the next frame according to the target image and the motion estimation vector.

* * * * *